(12) United States Patent
Shibuya et al.

(10) Patent No.: US 11,994,404 B2
(45) Date of Patent: May 28, 2024

(54) COMPUTATIONAL SYSTEM AND COMPUTATIONAL METHOD

(71) Applicant: Hitachi, Ltd., Tokyo (JP)

(72) Inventors: Kaoru Shibuya, Tokyo (JP); Akihito Akai, Tokyo (JP); Yuji Chiba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 95 days.

(21) Appl. No.: 17/734,607

(22) Filed: May 2, 2022

(65) Prior Publication Data

US 2022/0381571 A1    Dec. 1, 2022

(30) Foreign Application Priority Data

May 26, 2021    (JP) ................................ 2021-088120

(51) Int. Cl.
*G01C 21/34*    (2006.01)
*B60W 40/09*    (2012.01)

(52) U.S. Cl.
CPC ......... *G01C 21/3469* (2013.01); *B60W 40/09* (2013.01); *G01C 21/3484* (2013.01); *B60W 2510/081* (2013.01)

(58) Field of Classification Search
CPC ........... G01C 21/3469; G01C 21/3484; B60W 40/09; B60W 2510/081; B60W 40/00; B60W 40/08; B60W 40/10
USPC ........................................................ 701/533
See application file for complete search history.

(56) References Cited

U.S. PATENT DOCUMENTS

| | | | | |
|---|---|---|---|---|
| 5,913,917 A | * | 6/1999 | Murphy | B60R 16/0232 701/123 |
| 6,438,472 B1 | * | 8/2002 | Tano | G01C 21/26 701/25 |
| 7,521,935 B2 | * | 4/2009 | Uchida | G01R 31/3842 324/426 |
| 8,214,122 B2 | * | 7/2012 | Krupadanam | B60W 10/11 701/79 |
| 8,290,701 B2 | * | 10/2012 | Mason | G06Q 10/0833 701/422 |
| 8,706,409 B2 | * | 4/2014 | Mason | G06Q 10/063112 701/457 |

(Continued)

FOREIGN PATENT DOCUMENTS

JP    2009-31046 A    2/2009

*Primary Examiner* — Jaime Figueroa
(74) *Attorney, Agent, or Firm* — Crowell & Moring LLP

(57) ABSTRACT

A computational system estimating an energy consumption of a vehicle operated by a driver, the computational system includes a job progress calculator configured to calculate a job progress that is a delay time from a scheduled time on a simulation, an operation tendency storage configured to store tendency information that is a combination of a driver ID that is an identifier of the driver, the job progress, and an operation tendency of the vehicle, an operation tendency reader configured to read the operation tendency of the driver from the tendency information, using the job progress calculated by the job progress calculator, and the driver ID of the driver who is an computation target and a simulation computer configured to calculate the energy consumption of the vehicle, based on the operation tendency read by the operation tendency reader, with respect to each driver who is the computation target.

8 Claims, 23 Drawing Sheets

| DRIVER ID | DIFFERENCE FROM SCHEDULED TIME POINT (JOB PROGRESS) | OPERATION TENDENCY | |
|---|---|---|---|
| | | RAPID DECELERATION FREQUENCY | RAPID ACCELERATION FREQUENCY |
| ⋮ | ⋮ | ⋮ | ⋮ |
| N1 | -60 MIN. | 0.05 | 0.05 |
| ⋮ | ⋮ | ⋮ | ⋮ |
| N1 | 0 MIN. | 0.1 | 0.2 |
| ⋮ | ⋮ | ⋮ | ⋮ |
| N1 | 60 MIN. | 0.45 | 0.55 |
| ⋮ | ⋮ | ⋮ | ⋮ |
| N2 | -60 MIN. | 0.05 | 0.05 |
| ⋮ | ⋮ | ⋮ | ⋮ |

(56) References Cited

U.S. PATENT DOCUMENTS

| | | | | |
|---|---|---|---|---|
| 8,798,919 B2* | 8/2014 | Yano | G01C 21/3461 | 701/428 |
| 9,175,967 B2* | 11/2015 | Abramson | G01C 21/3415 | |
| 9,682,627 B2* | 6/2017 | Suzuki | B60R 16/0236 | |
| 11,614,335 B2* | 3/2023 | Wray | G01C 21/3685 | 701/22 |
| 2006/0142915 A1* | 6/2006 | Isono | B60W 10/08 | 701/1 |
| 2007/0029974 A1* | 2/2007 | Uchida | G01R 31/3842 | 320/132 |
| 2008/0249667 A1* | 10/2008 | Horvitz | B60W 40/072 | 701/1 |
| 2009/0259354 A1* | 10/2009 | Krupadanam | B60W 10/11 | 701/93 |
| 2010/0228405 A1* | 9/2010 | Morgal | B62H 3/00 | 701/1 |
| 2011/0238457 A1* | 9/2011 | Mason | G06Q 10/063112 | 705/7.14 |
| 2012/0022904 A1* | 1/2012 | Mason | G06Q 10/06311 | 705/333 |
| 2012/0029801 A1* | 2/2012 | Yano | G08G 1/096888 | 701/1 |
| 2012/0203409 A1* | 8/2012 | Sekijima | B60L 53/66 | 713/320 |
| 2013/0090881 A1* | 4/2013 | Janardhanan | G01C 21/18 | 702/104 |
| 2013/0179061 A1* | 7/2013 | Gadh | B60L 53/305 | 701/1 |
| 2013/0325335 A1* | 12/2013 | Kee | G01C 21/3469 | 701/527 |
| 2014/0046595 A1* | 2/2014 | Segawa | G01C 21/34 | 701/400 |
| 2014/0136037 A1* | 5/2014 | Yamamoto | B60L 3/12 | 903/903 |
| 2014/0350777 A1* | 11/2014 | Kawai | G07C 5/0808 | 701/32.3 |
| 2014/0371933 A1* | 12/2014 | Iwamura | G06Q 50/06 | 700/291 |
| 2015/0087264 A1* | 3/2015 | Goyal | H04W 4/027 | 455/411 |
| 2015/0151637 A1* | 6/2015 | Suzuki | B60L 3/12 | 701/22 |
| 2015/0168174 A1* | 6/2015 | Abramson | G01C 21/3407 | 701/408 |
| 2015/0175003 A1* | 6/2015 | Chao | G07C 5/0808 | 701/1 |
| 2015/0177010 A1* | 6/2015 | Abramson | H04W 4/12 | 701/400 |
| 2015/0210284 A1* | 7/2015 | Miyashita | B60W 30/18009 | 701/117 |
| 2015/0224845 A1* | 8/2015 | Anderson | F03G 7/08 | 701/37 |
| 2015/0317844 A1* | 11/2015 | Choi | G06F 16/2465 | 701/29.3 |
| 2017/0227573 A1* | 8/2017 | Theytaz | G01P 21/00 | |
| 2018/0111494 A1* | 4/2018 | Penilla | G06Q 20/145 | |
| 2018/0211349 A1* | 7/2018 | Knox | G06Q 50/30 | |
| 2019/0303999 A1* | 10/2019 | Hori | B60W 40/09 | |
| 2020/0211043 A1* | 7/2020 | Hori | G08G 1/0112 | |
| 2020/0286183 A1* | 9/2020 | Furukawa | G08G 1/00 | |
| 2022/0126864 A1* | 4/2022 | Moustafa | G08G 1/096758 | |
| 2022/0196418 A1* | 6/2022 | Wray | B60W 20/14 | |
| 2022/0205796 A1* | 6/2022 | Wray | G01C 21/3407 | |
| 2022/0291004 A1* | 9/2022 | Yokota | G01C 21/3469 | |
| 2023/0155409 A1* | 5/2023 | Matsumura | B60L 55/00 | 320/134 |

* cited by examiner

| JOB ID | DEPARTURE PLACE | ARRIVAL PLACE | ARRIVAL DEADLINE |
|---|---|---|---|
| T1 | S1 | G1 | 10:00:00 |
| T2 | S2 | G2 | 12:00:00 |
| ⋮ | ⋮ | ⋮ | ⋮ |

301a / 302a / 303a / 304a

114Q

| JOB ID | DRIVER ID | VEHICLE ID |
|---|---|---|
| T1 | N1 | V1 |
| T2 | N2 | V2 |
| ⋮ | ⋮ | ⋮ |

| DRIVER ID | JOB ID | CURRENT TIME POINT | CURRENT POSITION | PROGRESSION RATE | DIFFERENCE FROM SCHEDULED TIME POINT (JOB PROGRESS) |
|---|---|---|---|---|---|
| N1 | T1 | 9:05:00 | L1 | 8.33% | 0min |
| N2 | T2 | 10:40:00 | L2 | 20% | 10min |
| ⋮ | ⋮ | ⋮ | ⋮ | ⋮ | |

| DRIVER ID | VEHICLE ID | JOB ID | TIME AND DATE | POSITION | SPEED | ACCELERATION | ENERGY CONSUMPTION | ROAD GRADE | WEATHER | ... |
|---|---|---|---|---|---|---|---|---|---|---|
| N1 | V1 | T1 | 21/1/10, 9:00:00 | L1 | 60km | 1km/h/s | 10Wh/s | 2% | RAIN | ... |
| N1 | V1 | T1 | 21/1/10, 9:00:01 | L2 | 61km | 2km/h/s | 10.5Wh/s | 2% | RAIN | ... |
| ... | ... | ... | ... | ... | ... | ... | ... | ... | ... | ... |
| N2 | V2 | T2 | 21/1/10, 9:00:01 | L20 | 60km | 2km/h/s | 8Wh/s | 0.5% | FINE | ... |
| ... | ... | ... | ... | ... | ... | ... | ... | ... | ... | ... |

FIG. 14

| DRIVER ID | JOB ID | TIME AND DATE | PROGRE-SSION RATE | : | DIFFERENCE FROM SCHEDULED TIME POINT (JOB PROGRESS) | OPERATION TENDENCY ||
|---|---|---|---|---|---|---|---|
| | | | | | | ACCELE-RATION | SPEED |
| N1 | T1 | 21/1/10, 9:05:00 | 2% | : | 0min | 2km/h/s | 60km/s |
| : | : | : | : | : | : | : | : |
| N2 | T2 | 21/1/10, 9:40:00 | 12% | : | 10min | -5km/h/s | 55km/s |
| : | : | : | : | : | : | : | : |

| DRIVER ID (1701) | REST FREQUENCY (1702) | REST LENGTH (1703) |
|---|---|---|
| N1 | 1/5H | 20 MIN. |
| N2 | 1/6H | 30 MIN. |
| ⋮ | ⋮ | ⋮ |

| DRIVER ID | DIFFERENCE FROM SCHEDULED TIME POINT (JOB PROGRESS) | CONTINUOUS DRIVING TIME | OPERATION TENDENCY ||
|---|---|---|---|---|
| | | | RAPID DECELERATION FREQUENCY | RAPID ACCELERATION FREQUENCY |
| ⋮ | ⋮ | ⋮ | ⋮ | ⋮ |
| N1 | -10 MIN. | 0.5 HOURS | 0.01 | 0.01 |
| ⋮ | ⋮ | ⋮ | ⋮ | ⋮ |
| N1 | 10 MIN. | 0.5 HOURS | 0.03 | 0.02 |
| ⋮ | ⋮ | ⋮ | ⋮ | ⋮ |
| N1 | -10 MIN. | 5 HOURS | 0.05 | 0.02 |
| ⋮ | ⋮ | ⋮ | ⋮ | ⋮ |
| N2 | -10 MIN. | 0.5 HOURS | 0.01 | 0.01 |
| ⋮ | ⋮ | ⋮ | ⋮ | ⋮ |

| TRANSPORT OBJECT ID | JOB ID | LOADING PLACE | UNLOADING PLACE | WEIGHT | TYPE |
|---|---|---|---|---|---|
| 2201 | 2202 | 2203 | 2204 | 2205 | 2206 |
| B1 | T1 | S'1 | G'1 | 40kg | FRAGILE |
| : | : | : | : | : | : |

| DRIVER ID | DIFFERENCE FROM SCHEDULED TIME POINT | LOADING STATE | | OPERATION TENDENCY | |
|---|---|---|---|---|---|
| 2301 | 2302 | 2303 | | 2306 | |
| | | VEHICLE TOTAL WEIGHT | LOAD TYPE | RAPID DECELERATION FREQUENCY | RAPID ACCELERATION FREQUENCY |
| | | 2304 | 2305 | 2307 | 2308 |
| : | : | : | : | : | : |
| N1 | -10 MIN. | 1t | {FRAGILE} | 0.01 | 0.01 |
| : | : | : | : | : | : |
| N1 | 10 MIN. | 1t | {FRAGILE} | 0.03 | 0.02 |
| : | : | : | : | : | : |
| N1 | -10 MIN. | 2.5t | {LIVING THING} | 0.05 | 0.02 |
| : | : | : | : | : | : |
| N2 | -10 MIN. | 1t | {FRAGILE} | 0.01 | 0.01 |
| : | : | : | : | : | : |

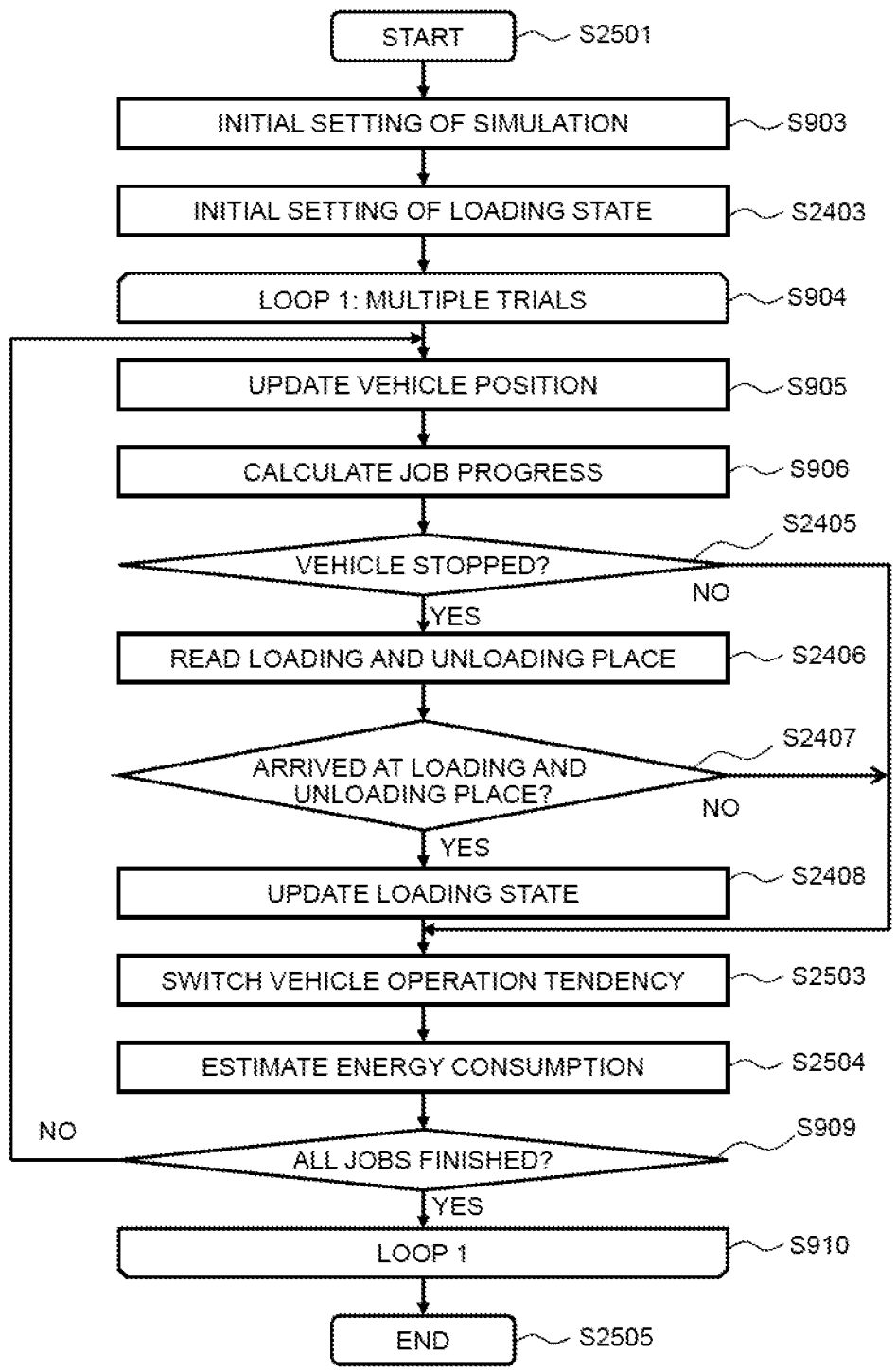

COMPUTATIONAL SYSTEM AND COMPUTATIONAL METHOD

BACKGROUND OF THE INVENTION

Field of the Invention

The present invention relates to a computational system, and a computational method.

Description of the Related Art

A technique of accurately estimating the energy consumption of a vehicle is a technique of planning an operation plan for performing efficient transport while preventing a hazard, such as a vehicle stop due to a lack of fuel, the technique being required to operate the vehicle. In particular, for electric vehicles (hereinafter, described as EVs) having become increasingly widespread, the technique is highly important because charging largely affects the transport efficiency. EVs require a long time for charging. Accordingly, an operation plan that does not cause charging during a transport job is required. The demand for estimating the vehicle energy consumption is increasing.

Existing means for estimating the energy consumption includes a simulator. The simulator estimates the energy consumption in consideration of travel situations, for example, the traffic volume around a vehicle. To improve the accurately of estimation by the simulator, factors affecting the vehicle energy consumption, which are not limited to the traffic volume, are required to be more accurately reflected. One of the factors to be accurately reflected is the personality of the driver. For example, the energy consumption due to vehicle braking is different depending on whether the brake is applied abruptly or deliberately. However, the way of braking depends on the personality of the driver. Accordingly, consideration of the personality of the driver can improve the accuracy of estimating the energy consumption of the vehicle.

A publicly known example of a technique of estimating the energy consumption of a vehicle in consideration of the personality of a driver is Japanese Patent Laid-open No. 2009-031046. Japanese Patent Laid-open No. 2009-031046 discloses a vehicle fuel consumption estimation system that obtains not only the fuel consumption and the travel distance according to the drive history from a vehicle, but also information about drive situations including at least one of vehicle state information and situation information on a route on which the vehicle has traveled, according to the drive history, obtains the fuel frequency distribution for each drive situation pattern, based on the information, obtains the fuel tendency of an individual driver of the vehicle for each drive situation pattern, based on the fuel frequency distribution, and predicts the fuel consumption of a scheduled travel route, based on the fuel cost tendency for each drive situation pattern.

SUMMARY OF THE INVENTION

According to the invention described in Japanese Patent Laid-open No. 2009-031046, use of the characteristics of the driver has a room for improvement.

According to the 1st aspect of the present invention, a computational system estimating an energy consumption of a vehicle operated by a driver, the computational system includes a job progress calculator configured to calculate a job progress that is a delay time from a scheduled time on a simulation, an operation tendency storage configured to store tendency information that is a combination of a driver ID that is an identifier of the driver, the job progress, and an operation tendency of the vehicle, an operation tendency reader configured to read the operation tendency of the driver from the tendency information, using the job progress calculated by the job progress calculator, and the driver ID of the driver who is an computation target and a simulation computer configured to calculate the energy consumption of the vehicle, based on the operation tendency read by the operation tendency reader, with respect to each driver who is the computation target.

According to the 2nd aspect of the present invention, a method of causing a computer to estimate an energy consumption of a vehicle operated by a driver, the method includes a job progress calculation step of calculating a job progress that is a delay time from a scheduled time on a simulation, a tendency information reading step of reading tendency information that is a combination of a driver ID that is an identifier of the driver, the job progress, and an operation tendency of the vehicle, an operation tendency reading step of reading the operation tendency of the driver from the tendency information, using the job progress calculated in the job progress calculation step, and the driver ID of the driver who is an computation target, and a simulation computing step of calculating the energy consumption of the vehicle, based on the operation tendency read in the operation tendency reading step, with respect to each driver who is the computation target.

According to the present invention, the energy consumption of the vehicle drive by the driver can be accurately estimated using the relationship between the job progress and the characteristics of the driver.

BRIEF DESCRIPTION OF THE DRAWINGS

FIG. 3 shows an example of a transportation plan stored in a transportation plan storage.

FIG. 4 shows an example of a job progress log calculated by a job progress calculator.

FIG. 13 shows an example of an operation log.

FIG. 14 shows an example of an operation tendency log.

FIG. 17 shows an example of physiological characteristics.

FIG. 19 shows an example of an operation tendency according to a fourth embodiment.

FIG. 22 shows an example of a transport object.

FIG. 23 shows an example of an operation tendency according to the fifth embodiment.

FIG. 25 is a flowchart of a process of energy consumption prediction according to the fifth embodiment.

DETAILED DESCRIPTION OF THE PREFERRED EMBODIMENTS

First Embodiment

Hereinafter, referring to FIGS. 1 to 9, a first embodiment of a computational system is described. According to this embodiment, in a simulation in a transport job, in conformity with the progress of a job engaged by each driver, the tendency of the vehicle operation that is characteristics specific to the driver is switched, thereby improving the accuracy of estimating the vehicle energy consumption.

An application assumed by this embodiment is a simulator of estimating the amount of energy consumed by the vehicle. By applying this technique to a case where the transport job cannot be performed according to a plan owing to a traffic jam or the like, the accuracy of estimating the vehicle energy consumption is improved by consideration of the vehicle operation tendency, which is characteristics specific to each driver, with respect to the job progress.

Figure 1:
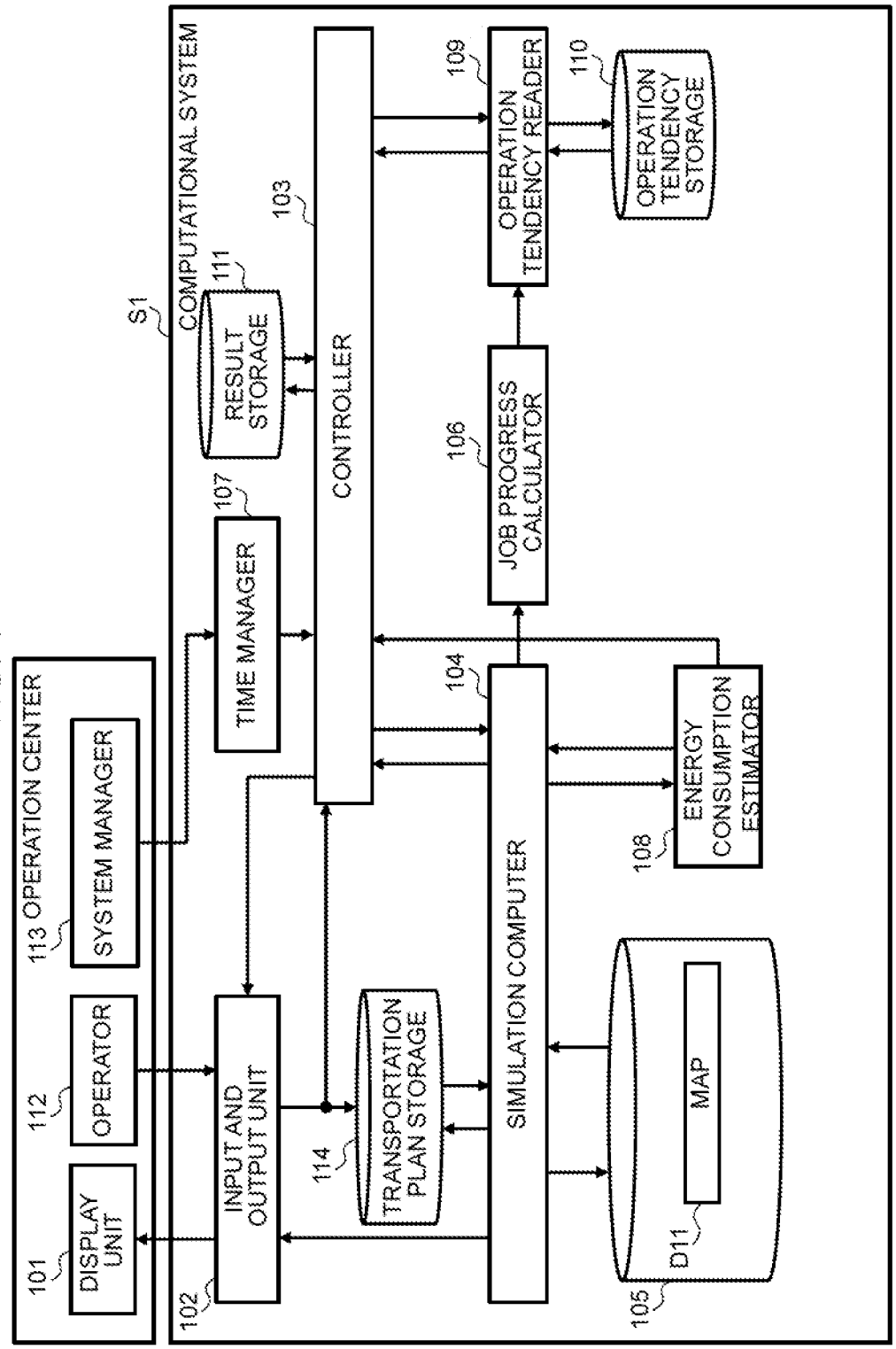
FIG. 1 is a configuration diagram showing a computational system according to a first embodiment.

FIG. 1 is a configuration diagram showing a computational system S1 according to a first embodiment. The computational system S1 operates together with an operation center. The operation center includes a display unit 101, an operator 112, and a system manager 113. The computational system S1 includes an input and output unit 102, a controller 103, simulation computer 104, a storage 105, a job progress calculator 106, a time manager 107, an energy consumption estimator 108, an operation tendency reader 109, an operation tendency storage 110, a result storage 111, and a transportation plan storage 114.

Figure 2:
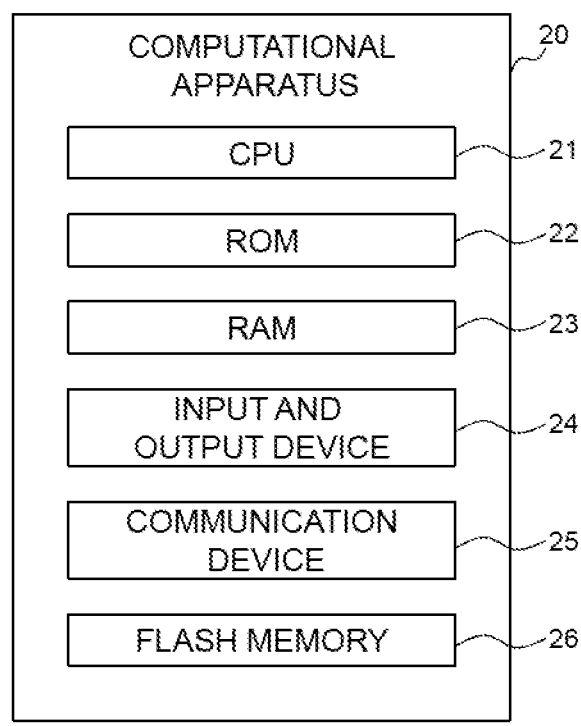
FIG. 2 shows an example of a computational apparatus typifying a hardware configuration of the computational system.

FIG. 2 shows an example of a computational apparatus 20 typifying the hardware configuration of the computational system S1. The computational apparatus 20 includes: a CPU 21 that is a central processing unit; a ROM 22 that is a storage device dedicated for reading; a RAM 23 that is a readable and writable device; an input and output device 24; a communication device 25; and a flash memory 26. The CPU 21 deploys on, the RAM 23, a program stored in the ROM 22, and executes the program, thereby performing various computations. The input and output device 24 may be, for example, a mouse and a keyboard. The communication device 25 is a communication module that wiredly or wirelessly communicates with the operation center. The flash memory 26 is a nonvolatile storage device, and may be another nonvolatile storage device, such as a hard disk drive, instead.

The computational apparatus 20 may achieve the computational functions by a FPGA (Field Programmable Gate Array), which is a rewritable logic circuit, or an ASIC, which is an application specific integrated circuit, instead of the combination of the CPU 21, the ROM 22 and the RAM 23. The computational apparatus 20 may achieve the computational functions, not necessarily by the combination of the CPU, the ROM and the RAM, and alternatively by a combination of different components, for example, a CPU, a ROM, a RAM and an FPGA.

The controller 103, the simulation computer 104, the job progress calculator 106, the time manager 107, the energy consumption estimator 108, and the operation tendency reader 109 are achieved by the combination of the CPU 21, the ROM 22 and the RAM 23. The storage 105, the operation tendency storage 110, the result storage 111, and the transportation plan storage 114 are achieved by the flash memory 26 of the computational apparatus 20. The input and output unit 102 is achieved by the combination of the input and output device 24 and the communication device 25.

FIG. 3 shows an example of a transportation plan stored in the transportation plan storage 114. The transportation plan includes: job content 114P that includes a job ID 301a that is an identifier of a job, a departure place 302a, an arrival place 303a, and an arrival deadline 304a; and a job assignment 114Q that includes a job ID 301b that is an identifier of a job, a driver ID 302b that is an identifier of a driver, and a vehicle ID 303b. The transportation plan is input through the input and output unit 102 by the operator 112.

The job ID 301a in the job content 114P, and the job ID 301b in the job assignment 114Q are the same type of information, and are identifiers for identifying a job. For instance, according to the example shown in FIG. 3, for a job having a job ID "T1", it is shown that the departure place is "S1", the arrival place is "G1", and the arrival deadline is "10:00:00". It is further shown that the job having a job ID "T1" is assigned to a driver having an ID "N1", and to a vehicle having an ID "V1".

FIG. 4 shows an example of a job progress log 400 calculated by the job progress calculator 106. The job progress log 400 includes a driver ID 401 that is an identifier of a driver, a job ID 402 that is an identifier of a job, a current time point 403, a current position 404, a progression rate 405, and a difference 406 from a scheduled time point. Hereinafter, the difference 406 from the scheduled time point is also called "job progress" 406.

Figure 5:
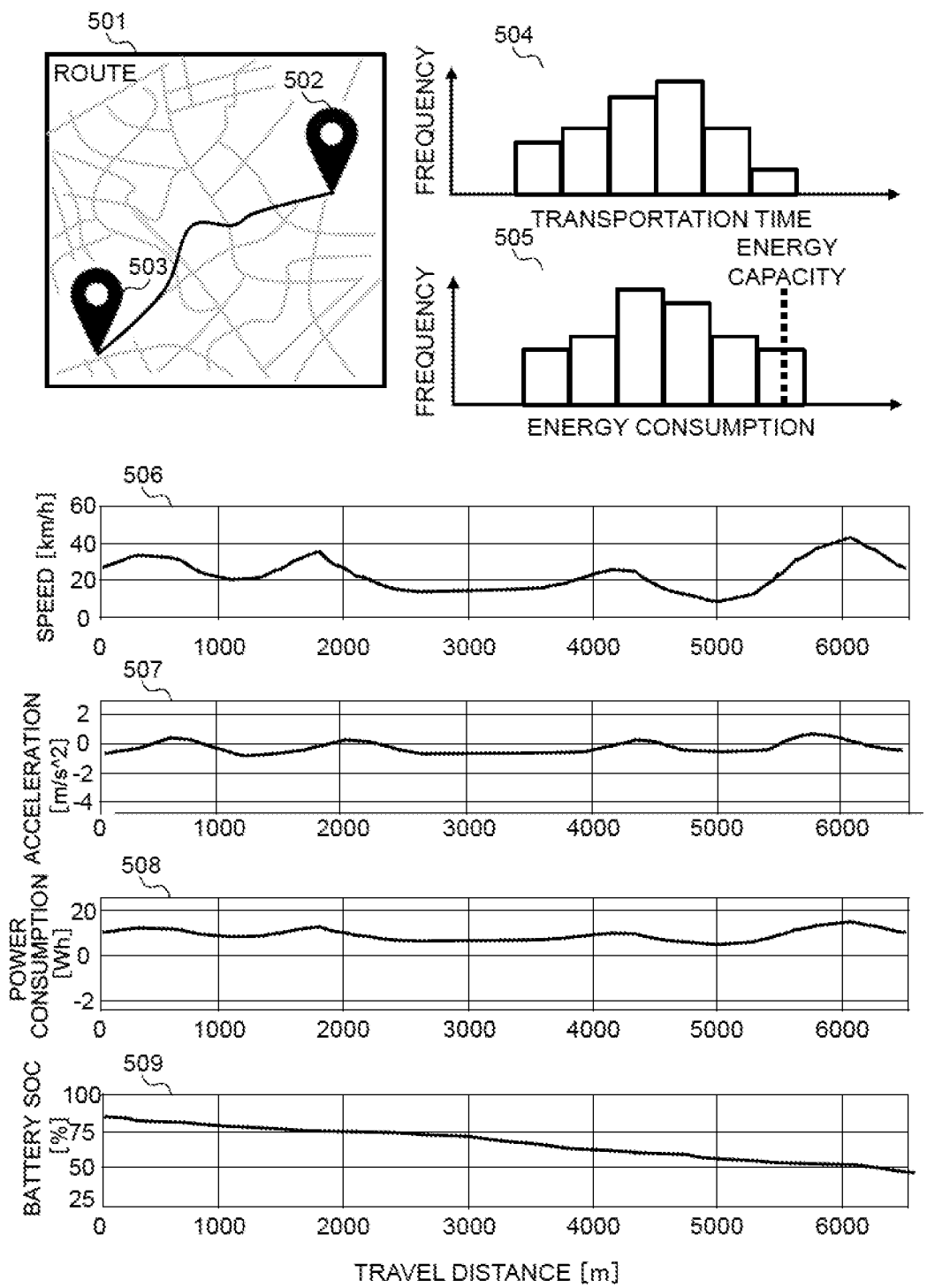
FIG. 5 shows an example of a vehicle energy consumption displayed on a display unit.

FIG. 5 shows an example of a vehicle energy consumption displayed on a display unit 101. Specifically, a route of a vehicle on a map 501 is displayed with a start point 502 and an end point 503. The representative values of the vehicle speed, acceleration, energy consumption, and remaining battery life at each point from the start point 502 to the end point 503 are displayed in graph forms as indicated respectively by symbols 506 to 509. Multiple simulations with different positions and speeds of other vehicles are executed. The resultantly obtained frequency distributions of the transportation time and the power consumption are indicated by symbols 504 and 505. If the degree of variation in traffic volume is preliminarily known, variation information may be applied to a result obtained by one simulation, and estimated frequency distributions may be created.

Figure 6:
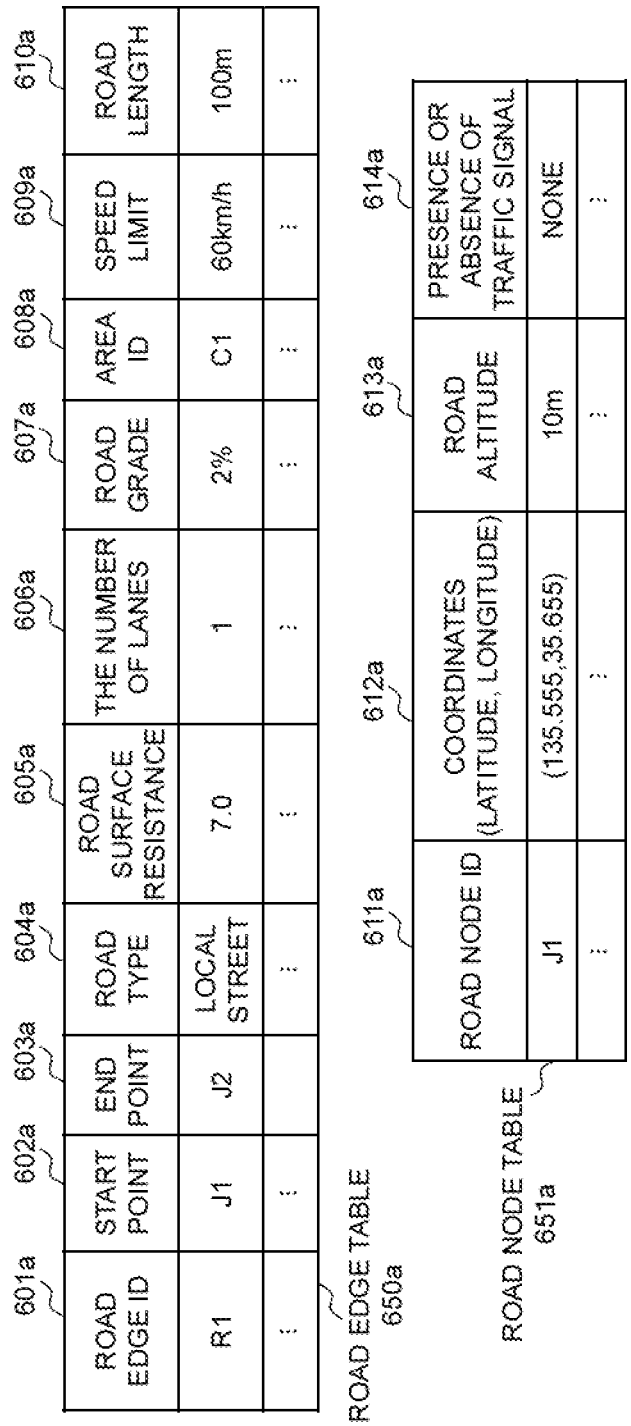
FIG. 6 shows an example of a map.

FIG. 6 shows an example of a map D11. In this embodiment, "node" representing an intersection or an end, and "edge" representing a road that couples intersections to each other are used and the map is represented. Note that "edge" is also called "link". Hereinafter, "edge" is called "road edge", and "node" is called "road node". The map D11 includes a road edge table 650a, and a road node table 651a.

As shown in the road node table 651a, for each road node, this table records an identifier, i.e., a road node ID 611a, coordinates 612a, a road altitude 613a, and presence or absence of a signal 614a are recorded. As shown in the road edge table 850a, for each road edge, this table records a road edge ID 601a that is an identifier, road node IDs 602a and 603a of the start point and an end point, a road type 604a, a road surface resistance 605a, the number of lanes 606a, a road grade 607a, an area ID 608a, a speed limit 609a, and a road length 610a.

Figure 7:
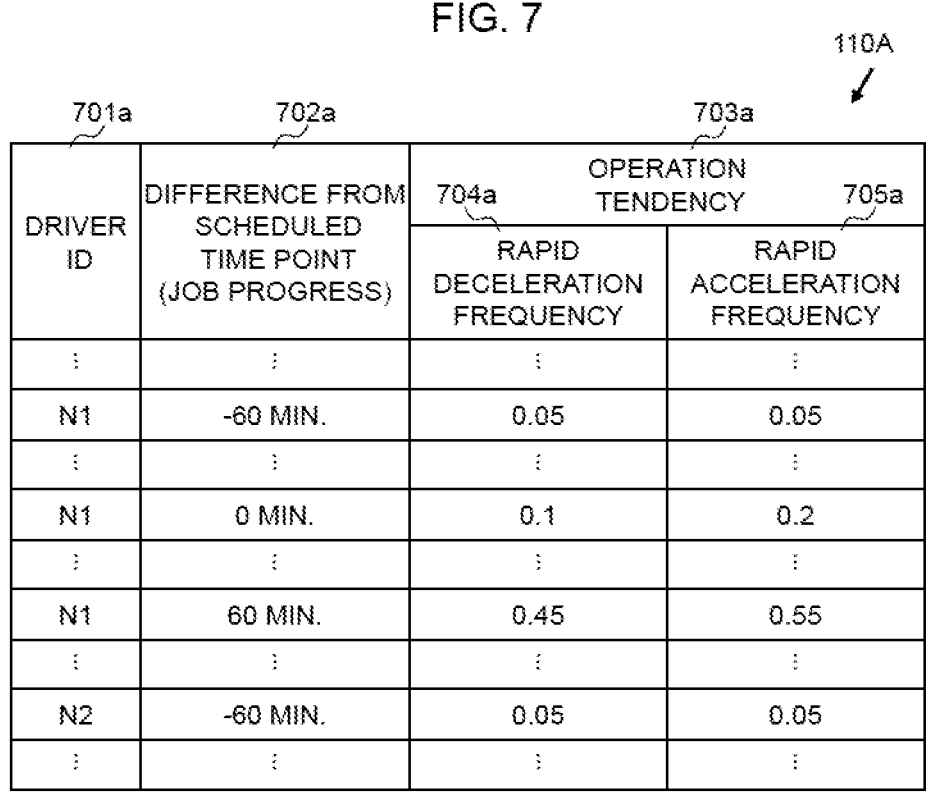
FIG. 7 shows an example of an operation tendency stored in the operation tendency storage.

FIG. 7 shows an example of an operation tendency 110A stored in the operation tendency storage 110. The operation tendency 110A indicates the association between the job progress and the operation tendency, for each driver. Specifically, the operation tendency 110A includes multiple combinations each including: a driver ID 701a that is an identifier of a driver; a job progress 702a that is a difference from the scheduled time point; and an operation tendency 703a. The operation tendency 703a includes a rapid deceleration frequency 704a, and a rapid acceleration frequency 705a. In this embodiment, the operation tendency 110A is preliminarily created.

A schematic flow of information in the block diagram shown in FIG. 1 is as follows. On the operation center side, the operator 112 inputs a transportation plan shown in FIG. 3. After the transportation plan is input, simulation is performed on the computational system, and the vehicle energy consumption is estimated. In each step of the simulation, according to the driver's job progress, the operation tendency specific to the driver is switched, and the vehicle energy consumption is estimated.

Hereinafter, each configuration element in the block diagram shown in FIG. 1 is specifically described. First, the input and output unit 102 receives a transportation plan as an input from the operator 112. It is assumed that when a certain driver is assigned a plurality of job IDs 301b, the simulation computer 104 determines the order of the jobs, based on the arrival place 303a and the arrival deadline 304a, and the driver sequentially performs the jobs. When the driver is assigned the plurality of jobs, the job progress log 400 is calculated, based on the route to the last job assigned to the driver, and on the arrival deadline 304a of the last job. A method of calculating the job progress log 400 is described later.

The display unit 101 displays a calculation result of the vehicle energy consumption estimated by the computational system. A display example on the display unit 101 is as shown in FIG. 5. Upon acceptance of the transportation plan input from the operator 112, the input and output unit 102 transmits the driver ID 302b to the controller 103, described later, and transmits the transportation plan to the simulation computer 104. Subsequently, the input and output unit 102 accepts the calculation result of the simulation output by the simulation computer 104, and displays the calculation result on the display unit 101.

The controller 103 transmits the operation tendency obtained from the operation tendency reader 109, to the simulation computer 104, every time interval received from the time manager 107. The position and speed of the vehicle are received from the simulation computer 104 as the simulation progress, the energy consumption is received from the energy consumption estimator 108, and the received items are written into the result storage 111. After the vehicle's speed, acceleration, energy consumption, and remaining amount of energy at each point during travel by the driver from the departure place 302a to the arrival place 303a are obtained as the calculation result, the controller 103 writes the calculation result in the result storage 111. The controller 103 executes the series of trials until obtainment of the calculation result from the simulation computer 104 the number of repetitive times received from the time manager 107, with the uncertainty, such as congestion, in the simulation being changed. The vehicle's speed, acceleration, energy consumption, and remaining amount of energy at each point, and the energy consumption and the transportation time obtained by the number of repetitive times of trials are transmitted as a calculation result to the input and output unit 102.

The simulation computer 104 receives the driver ID 302b, the vehicle ID 303b, the departure place 302a, the arrival place 303a, and the arrival deadline 304a, as the transportation plan, from the input and output unit 102, and subsequently performs initial setting of the simulation. Next, based on the departure place 302a and the arrival place 303a received from the input and output unit 102, the map D11 is read from the storage 105, and the route is calculated. The initial setting of the simulation is as thus described above.

After the initial setting of the simulation is finished, the simulation is started, and the position and the speed of the vehicle are updated as the time in the simulation elapses. The present invention is characterized in that in the process of the simulation, according to the driver's job progress, the vehicle operation tendency of the driver is switched, and the energy consumption is estimated. The simulation is described later in details.

The simulation computer 104 transmits the current position, the route from the departure place 302a to the arrival place 303a, the current time point 403 in the simulation, and the arrival deadline 304a, which are required to calculate the job progress, to the job progress calculator 106, described later. The operation tendency 703a of the driver associated with the driver ID 701a is received every constant time interval from the controller 103, and the position and the speed of the vehicle are transmitted to the controller 103. The time interval is input by the system manager 113 into the time manager 107, and is transmitted to the controller 103.

The job progress calculator 106 calculates the job progress of each driver at each time point in the simulator. The job progress calculator 106 calculates the distance from the departure place 302a to the current position, and the distance from the current position to the arrival place 303a, based on the current position received from the simulation computer 104 and on the route from the departure place 302a to the arrival place 303a. Next, the job progress calculator 106 calculates the scheduled time point of passage through the current position, based on the distance from the current position to the arrival place 303a and on the arrival deadline 304a, and the difference between the scheduled passage time point and the current time point, i.e., the job progress 702a to the operation tendency reader 109.

The operation tendency reader 109 reads the operation tendency 703a of the driver from the operation tendency storage 110, based on the job progress 702a received from the job progress calculator 106 and on the driver ID 701a received from the controller 103, and transmits the operation tendency 703a associated with the driver ID 701a to the controller 103. Accordingly, computation can be achieved in consideration of the frequencies of rapid deceleration and rapid acceleration of each driver according to the job progress.

Hereinafter, in comparison with a comparative example, which is a conventional method, processes in this embodiment are described. One method of estimating the amount of energy of a vehicle during a transport job is a method of estimating the final energy consumption of a vehicle by repeating estimation of the travel of the vehicle and the energy consumption from start of the simulation to the end of the job. In the estimation method described above, FIG. 8 shows a flowchart of processes of the comparison example, which is the conventional method, and FIG. 9 shows a flowchart of processes according to this embodiment. In comparison between the processes in this embodiment and in the comparative example, two elements that are a job progress calculation process 706 and a vehicle operation tendency changing process 707 are added. In the processes according to this embodiment, the points not specifically described are similar to those in the comparative example.

Figure 8:
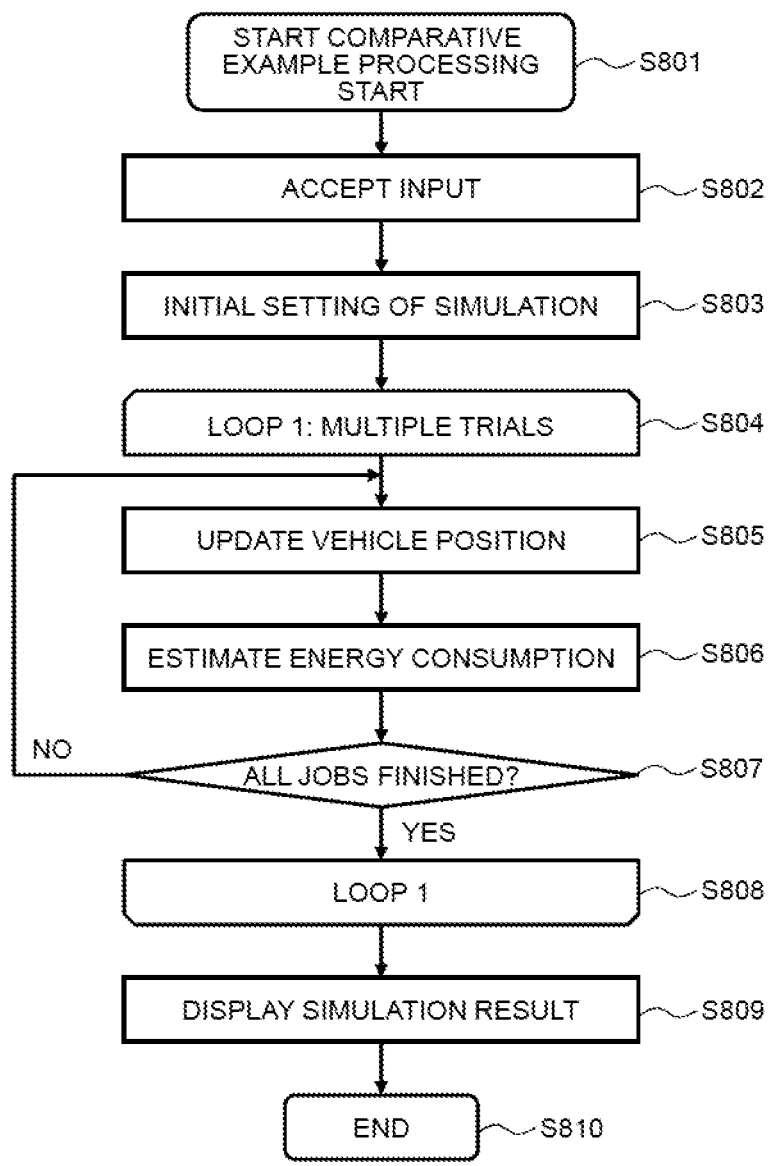
FIG. 8 is a flowchart showing a comparative example process that is a process of a comparative example.
Figure 9:
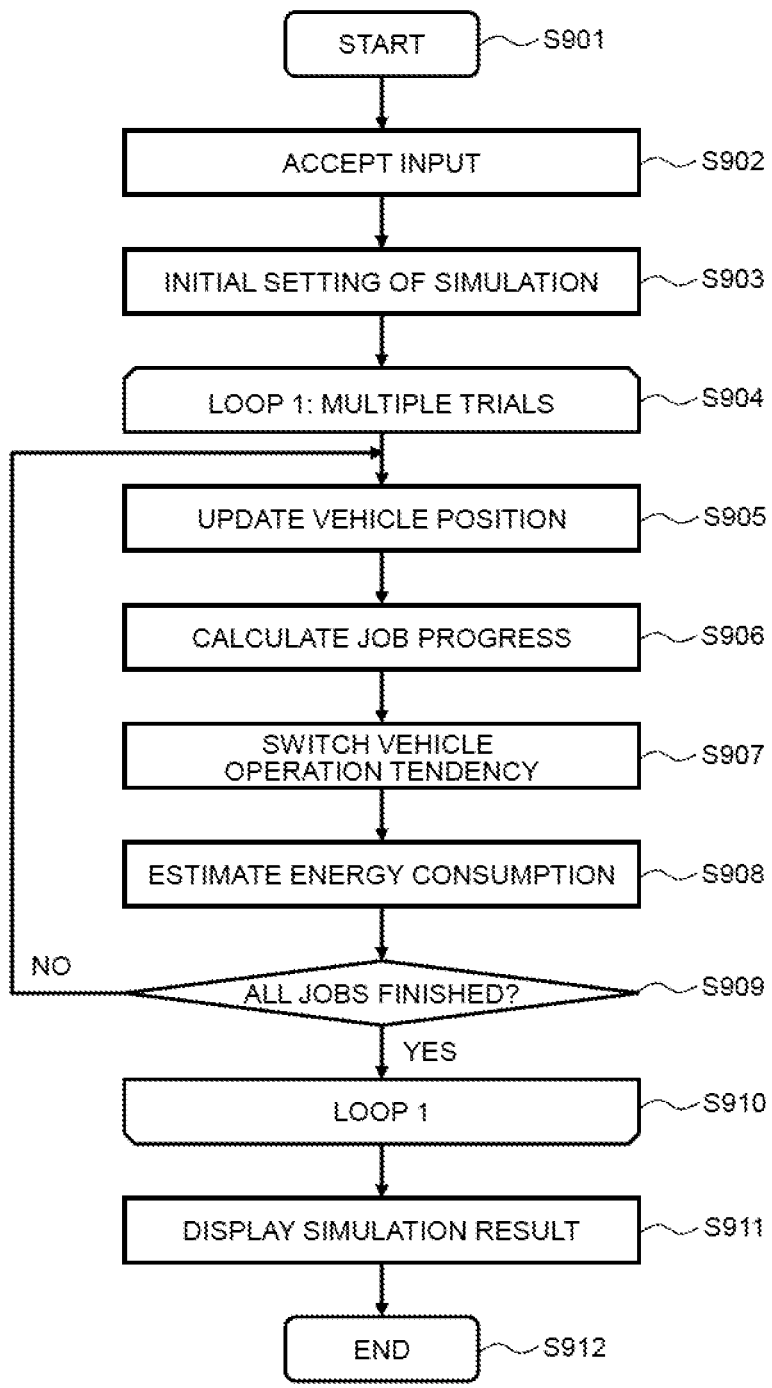
FIG. 9 is a flowchart showing a computational system according to the first embodiment.

The comparative example processes shown in FIG. 8 are described. Hereinafter, the element executing the processes of the comparative example is assumed as "comparative-example CPU", and description is made. When the processing is started in step S801, in subsequent step S802 the comparative-example CPU reads the transportation plan, as an input acceptance process, from the transportation plan storage 114. For example, the comparative-example CPU sequentially reads the job ID 301*b* in a descending order in the description in the job assignment 114Q, and identifies the combination of the departure place 302*a* and the arrival place 303*a* for the associated job ID 301*a* in the job content 114P.

In subsequent step S803, the initial setting of the simulation is configured, and the route is calculated for each combination of the departure place 302*a* and the arrival place 303*a* identified in step S802. The comparative-example CPU performs the loop process in steps S804 to S808 multiple times for every job. In the loop process, first in step S805 the position of the vehicle on the route calculated in step S803 is updated. Subsequently, in step S806, the energy consumption is estimated. The update of the position of the vehicle is calculated based on a specified time interval in the simulation, for example, one second, and on the speed vector of the vehicle at the timing.

In subsequent step S807, it is determined whether all the jobs have been finished or not. If it is determined that all the jobs have been finished, the processing proceeds to step S808. If it is determined that a job having not been finished remains, the processing returns to step S805. For example, when the comparative-example CPU determines that the vehicle arrives at "G1" in a job having a job ID 301*a* "T1" in the example shown in FIG. 3, the next job "T2" remains. Accordingly, the comparative-example CPU makes negative determination in step S807, and returns to step S805, and starts the travel of the vehicle from "S2" serving as the departure place 302*a* in the job "T2".

Steps S805 and S806 are described. (Expression 1) is used to update the position of the vehicle. (Expression 2) is used to estimate the energy consumption.

$$L=L+V(t)*\delta t \quad \text{(Expression 1)}$$

$$E=E+Ea+Eo \quad \text{(Expression 2)}$$

Note that in Expressions 1 and 2, L indicates the position of the vehicle, V(t) is a function of returning the vehicle speed at time t in the simulation, δt indicates the time interval at which the position is updated in the simulation, E indicates the energy consumption, Ea indicates the energy consumption due to acceleration and deceleration in each travel condition, and Eo indicates the energy consumption due to factors other than acceleration and deceleration. By repeating (Expression 1) and (Expression 2) until the progression rate P calculated by (Expression 3) becomes one, the vehicle energy consumption is calculated, and the processes so far are regarded as one trial.

$$P=D(S,L)/D(S,G) \quad \text{(Expression 3)}$$

Note that in Expression 3, S indicates the departure place, G indicates the arrival place, and D is a function of calculating the distance between the two points on the route. Here, the vehicle speed V(t) in (Expression 1) considers a stochastic event, such as a congestion situation on the road, and does not necessarily return a constant value accordingly. In this case, provided that obtainment of the energy consumption E through repetition of the calculation of (Expression 1) and (Expression 2) until completion of the job is regarded as one trial, the energy consumption E in each trial is not constant. Accordingly, by executing the trial described above for the number of repetitive times, the expectation of the energy consumption E is obtained.

In the estimation method in the comparative example, the energy consumption Ea per acceleration or deceleration is assumed as a constant. This shows that there is a room for improvement. In this embodiment, as shown in step S907 in FIG. 9, the vehicle operation tendency that is characteristics specific to each driver is switched in the process of the simulation. The energy consumption Ea per acceleration or deceleration can change due to various factors. An attention is focused on a fact that the progress of the transport job can affect the mind of the driver, and estimation is performed by the following (Expression 4).

$$E=E+Ea(I(Dt))+Eo \quad \text{(Expression 4)}$$

Note that in Expression 4, E indicates the energy consumption, Ea is a function of the energy consumption due to acceleration or deceleration in each travel condition, I is a function of outputting the operation tendency of the driver based on the difference from the scheduled time point, and Dt indicates the difference between the current time point and the scheduled time point, i.e., the job progress. As shown in (Expression 5), the job progress Dt can be calculated by the difference between the scheduled required time at the progression rate P P*(Te−Ts) and the time (t−Ts) actually required in the simulation.

$$Dt=P*(Te-Ts)-(t-Ts) \quad \text{(Expression 5)}$$

Note that in Expression 5, Dt indicates the job progress, Te indicates the arrival deadline, Ts indicates the departure time point, t indicates the time point in the simulation, and P indicates the job progress at the time point t calculated by (Expression 3). The function I in (Expression 4) for outputting the operation tendency of the driver associated with the job progress Dt considers factors indicating that the job progress Dt affects the mind and behavior of the driver and the energy consumption. In a case of consideration of the frequencies of occurrence of rapid deceleration and rapid acceleration as an example, the function Ea of the energy consumption per acceleration or deceleration is obtained by the following (Expression 6), assuming that the function of outputting the rapid deceleration frequency associated with the job progress Dt is Ide, and the function of outputting the rapid acceleration frequency associated with the job progress Dt is Iac.

$$Ea(I(Dt))=\{Eac1*(1-Iac(Dt))+Eac2*Iac(Dt)\}+ \\ \{Ede1*(1-Ide(Dt))+Ede2*Ide(Dt)\} \quad \text{(Expression 6)}$$

Specifically, the function Ide obtains the frequency 704*a* of rapid deceleration from the operation tendency 110A, based on the job progress Dt and driver ID. Specifically, the function Iac obtains the frequency 705a of rapid acceleration from the operation tendency 110A, based on the job progress Dt and driver ID. In (Expression 6), Eac1 indicates a normal acceleration energy consumption, Eac2 in indicates the energy consumption of rapid acceleration, Ede1 is a normal deceleration energy consumption, and Ede2 is a rapid deceleration energy consumption.

According to the first embodiment described above, the following working effects are achieved.

(1) A computational system S1 estimating an energy consumption of a vehicle operated by a driver, includes: a job progress calculator 106 configured to calculate a job progress that is a delay time from a scheduled time on a simulation; an operation tendency storage 110 configured to store a driver ID that is an identifier of the driver, the job progress, and tendency information that is an association with an operation tendency of the vehicle; an operation tendency reader 109 configured to read the operation tendency of the driver from the operation tendency 110A, using the job progress calculated by the job progress calculator 106, and the driver ID of the driver who is an computation target; and a simulation computer 104 configured to calculate the energy consumption of the vehicle, based on the operation tendency read by the operation tendency reader 109, with respect to each driver who is the computation target. Accordingly, the energy consumption of the vehicle driven by the driver can be accurately estimated using the relationship between the job progress and the characteristics of the driver. Specifically, an attention is focused on the lapse of time in the simulation, and the vehicle operation tendency of the driver is switched at every job progress, and the energy consumption is calculated, thereby allowing energy consumption to be estimated according to the job progress.

(2) A transportation plan storage 114 configured to store job information that indicates a departure place, a destination place, and a scheduled arrival time point at the destination place, is provided with respect to each driver. The job progress calculator 106 calculates the job progress, based on the position of the driver at a certain time point on the simulation, and the job information. Thus, the job progress according to the situations of the simulation can be calculated.

(3) The operation tendency includes at least one of the frequency of a sudden start, and the frequency of a sudden stop. Accordingly, the frequencies of the sudden start and the sudden stop that largely affect the vehicle energy consumption are switched with respect to each job progress that is the delay from the scheduled time point and each driver, thereby allowing the accuracy of estimating the energy consumption to be improved.

Modified Example 1

In the first embodiment described above, the frequencies of rapid deceleration and rapid acceleration are exemplified as the personality of the driver, and description is made. Furthermore, the speed or the like, which is a factor where the job progress affects the driver, is used and the energy consumption can be estimated. (Expression 3) calculates the progression rate P, based on the distance to the destination place. However, the distance may be weighted based on the traffic volume and the average vehicle speed, and the progression rate P may be calculated.

Modified Example 2

In the first embodiment described above, the description has been made so that the computational system S1 is made up of a computational apparatus 20. Alternatively, the computational system S1 may be made up of a plurality of hardware apparatuses. In this case, the configuration does not necessarily include the same apparatuses identical to the computational apparatus 20. Alternatively, a plurality of hardware apparatuses may have the configuration included in the computational apparatus 20 as a whole.

Second Embodiment

Hereinafter, referring to FIGS. 10 and 11, a second embodiment of a computational system is described. In the following description, configuration elements identical to those in the first embodiment are assigned the same symbols, and differences are mainly described. What is not specifically described is the same as in the first embodiment. This embodiment is different from the first embodiment in that detailed situations during travel, such as the road grade and the wind speed, affecting the vehicle operation tendency are mainly adopted as the travel conditions, are reflected in the simulation, and the energy consumption is estimated.

In this embodiment, during the driver's vehicle operation, not only the speed of the vehicle but also situations physically affecting the vehicle energy consumption, such as the road grade and the wind speed, are adopted as the travel conditions, and are reflected on the simulation, thereby improving the accuracy of estimating the vehicle energy consumption.

Figure 10:
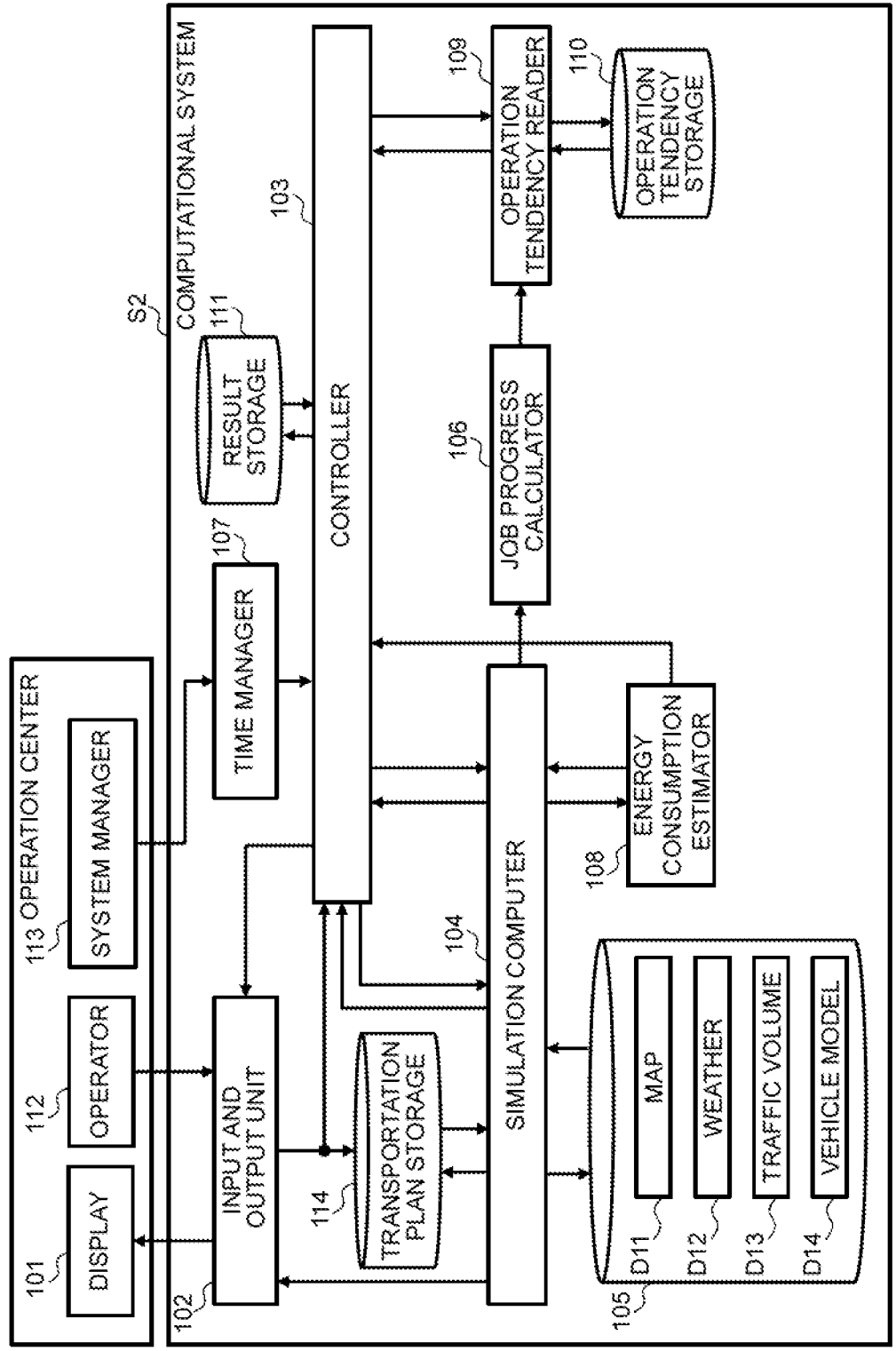
FIG. 10 is a configuration diagram showing a computational system according to a second embodiment.

FIG. 10 is a configuration diagram showing a computational system S2 according to a second embodiment. The difference from the first embodiment is in that not only the map D11 but also weather D12, a traffic volume D13, and a vehicle model D14 are further stored in the storage 105.

Figure 11:
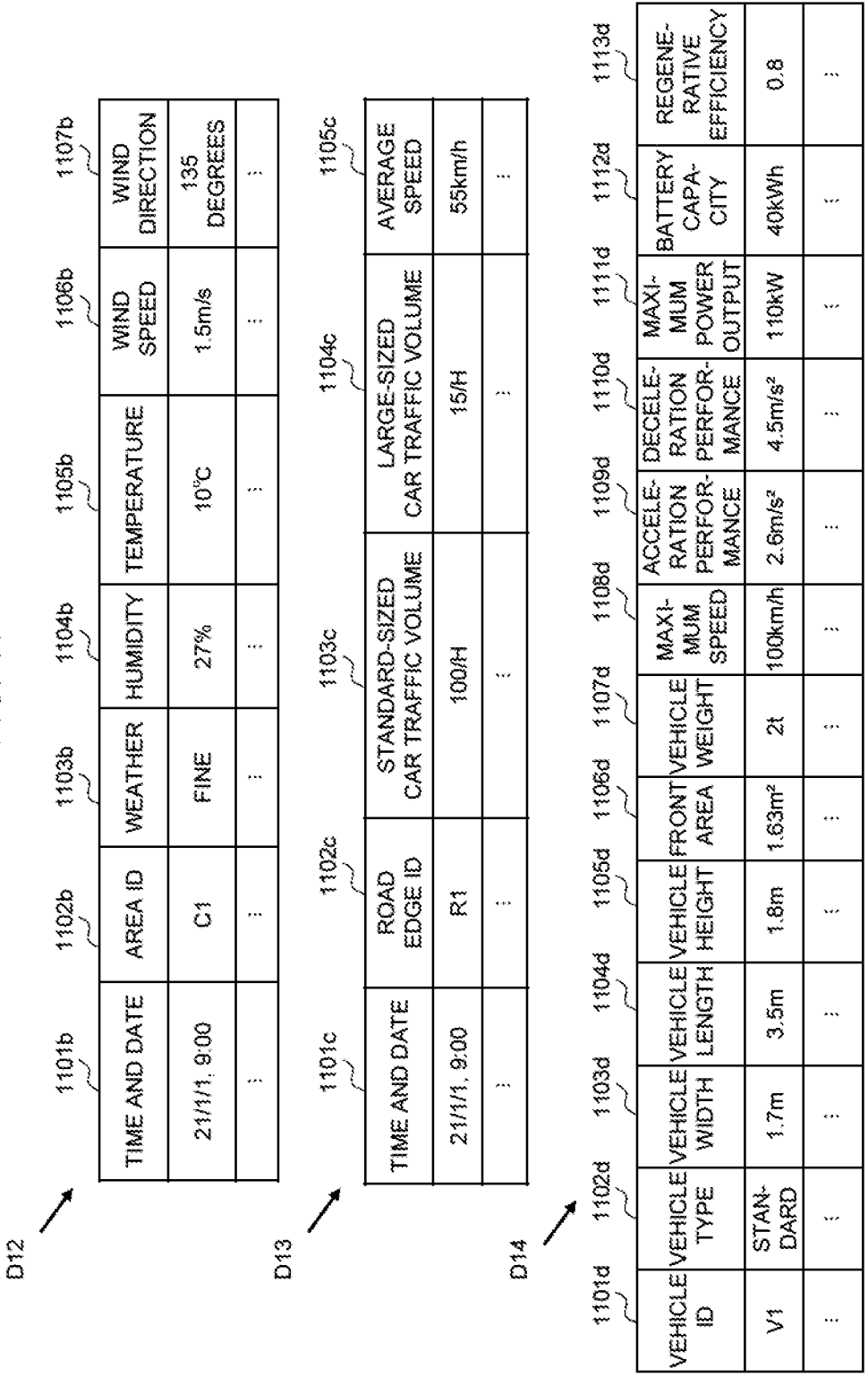
FIG. 11 shows an example of weather, a traffic volume, and a vehicle model.

FIG. 11 shows an example of the weather D12, the traffic volume D13 and the vehicle model D14, which are further stored in the storage 105 in this embodiment. For the weather D12, a record to be referred to is identified by the combination of a time and date 1101b and an area ID 1102b unique to an area. The weather D12 includes the time and date 1101b, the area ID 1102b, weather 1103b, humidity 1104b, temperature 1105b, wind speed 1106b, and wind direction 1107b. Note that the area ID 608a on the map D11 is used to read the weather D12 associated with the position of the vehicle driven by the driver.

For the traffic volume D13, a record to be referred to is identified by the combination of a time and date 1101c, and a road edge ID 1102c that is a number unique to a road edge. The traffic volume D13 includes: the time and date 1101c; the road edge ID 1102c; a standard-sized car traffic volume 1103c that is the number of standard-sized cars passing through the road edge per unit time; a large-sized car traffic volume 1104c that is the number of large-sized cars passing through the road edge per unit time; and the average speed 1105c of vehicles passing through the road.

The vehicle model D14 includes a vehicle ID 1101d that is a number unique to the vehicle, the vehicle type 1102d, the vehicle width 1103d, the vehicle length 1104d, the vehicle height 1105d, the front area 1106d, the vehicle weight 1107d, the maximum speed 1108d, the acceleration performance 1109d, the deceleration performance 1110d, the maximum power output 1111d, the battery capacity 1112d, and the regenerative efficiency 1113d.

The weather D12, the traffic volume D13, and the vehicle model D14 shown in FIG. 11 include factors that affect the drivability of the driver. The factors include: the road surface resistance 605a and the change in view from the driver's seat due to the weather 1103b; the change in wind force applied to the vehicle due to the wind speed 806c and the wind direction 807c; the change in operability due to the difference of the vehicle type 1102d; and the difference of application of the wind force due to the difference of the front area 1106d. In the first embodiment, the map D11 shown in FIG. 6 includes information on the road grade 607a. This information similarly affects the drivability of the driver.

The simulation computer 104 according to this embodiment estimates the vehicle energy consumption, in consideration not only of the information according to the first embodiment, but also of the driver's travel conditions, specifically, at least one of the road grade 607a, the weather 1103b, the road surface resistance 605a, the wind speed 806c, the wind direction 807c, the vehicle type 1102d, the front area 1106d, and the road grade 607a. For example, the simulation computer 104 reads, from the storage 105, the vehicle model D14 associated with the vehicle ID 303b received from the input and output unit 102, in the initial setting of the simulation. At each time point in the simulation, the simulation computer 104 reads the road grade and the weather D12, and the traffic volume D13, which are associated with the position of the vehicle, from the storage 105, and transmits the read pieces, as the travel conditions of the vehicle, to the energy consumption estimator 108. The energy consumption estimator 108 can improve the accuracy of estimating the energy consumption in the simulation, using the transmitted information.

According to the second embodiment described above, the following working effects are achieved.

(4) The simulation computer 104 calculates the energy consumption of the vehicle, further using at least one of the inclination angle of the road surface, the weather, the traffic volume, and the vehicle model. Accordingly, the simulation computer 104 can improve the accuracy of estimating the energy consumption, using the inclination angle of the road surface, the weather, the traffic volume, the vehicle model and the like.

Modified Example of Second Embodiment

It is also assumed that for a certain driver, the vehicle operation tendency is different with respect to each of the inclination angle of the road surface, the weather, the traffic volume, and the vehicle model. Accordingly, the operation tendency 110A may be further combined with at least one of the inclination angle of the road surface, the weather, the traffic volume, and the vehicle model. In this case, the operation tendency reader 109 reads the operation tendency of the driver from the operation tendency 110A, using at least one of the inclination angle of the road surface, the weather, the traffic volume, and the vehicle model, in addition to the job progress and the driver ID, and transmits the operation tendency to the simulation computer 104.

Third Embodiment

Hereinafter, referring to FIGS. 12 to 15, a third embodiment of a computational system is described. In the following description, configuration elements identical to those in the first embodiment are assigned the same symbols, and differences are mainly described. What is not specifically described is the same as in the first embodiment. This embodiment is different from the first embodiment mainly in that the function of associating the job progress with the operation tendency is learned from operation log data on the driver's vehicle.

Figure 12:
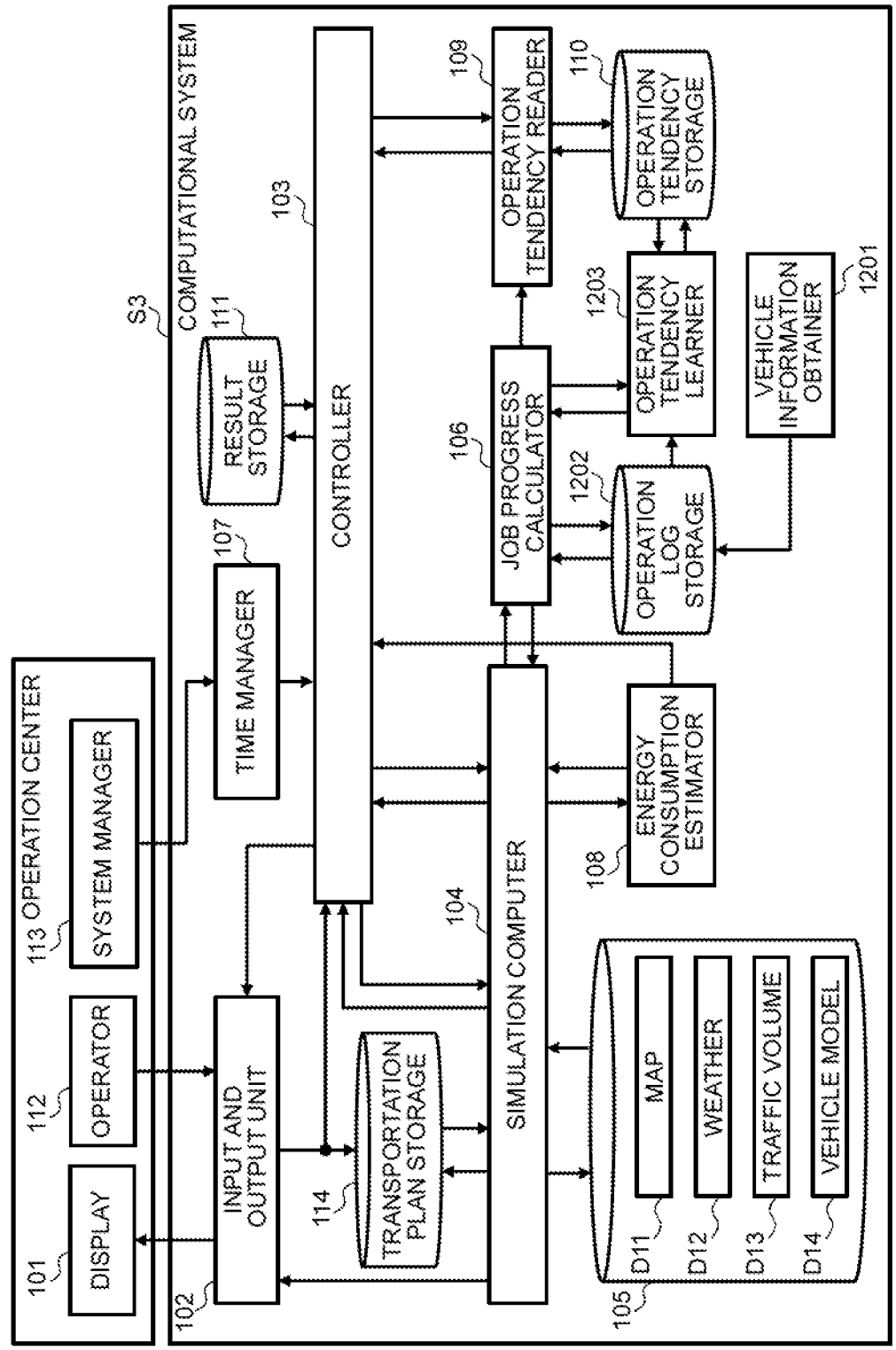
FIG. 12 is a configuration diagram showing a computational system according to a third embodiment.

FIG. 12 is a configuration diagram showing a computational system S3 according to a third embodiment. In comparison with the first embodiment, the computational system S3 further includes a vehicle information obtainer 1201, an operation log storage 1202, and an operation tendency learner 1203. The vehicle information obtainer 1201 obtains an operation log 1250 that is data where the vehicle operation of each driver engaged in the transport job is recorded at each time point, and writes the log in the operation log storage 1202.

FIG. 13 shows an example of the operation log 1250. The operation log 1250 includes a driver ID 1301, a vehicle ID 1302, a job ID 1303, a time and date 1304, a position 1305, a speed 1306, an acceleration 1307, an energy consumption 1308, road grade 1309, and weather 1310.

The operation tendency learner 1203 reads the operation log 1250 from the operation log storage 1202, obtains the operation tendency of the driver associated with the driver ID 1301 described in the operation log 1250, and calculates the job progress log 400 of the driver described above through the job progress calculator 106. The operation tendency learner 1203 creates an operation tendency log 1202A, based on the operation tendency of the driver described above and the job progress log 400, learns the association between the job progress and the operation tendency with respect to each driver, and writes a learning result in the operation tendency storage 110.

FIG. 14 shows an example of the operation tendency log 1202A. The operation tendency log 1202A includes a driver ID 1401, a job ID 1402, a time and date 1403, a progression rate 1404, a difference 1405 from the scheduled time point, and an operation tendency 1406. The operation tendency 1406 includes an acceleration 1407, and a speed 1408.

Figure 15:
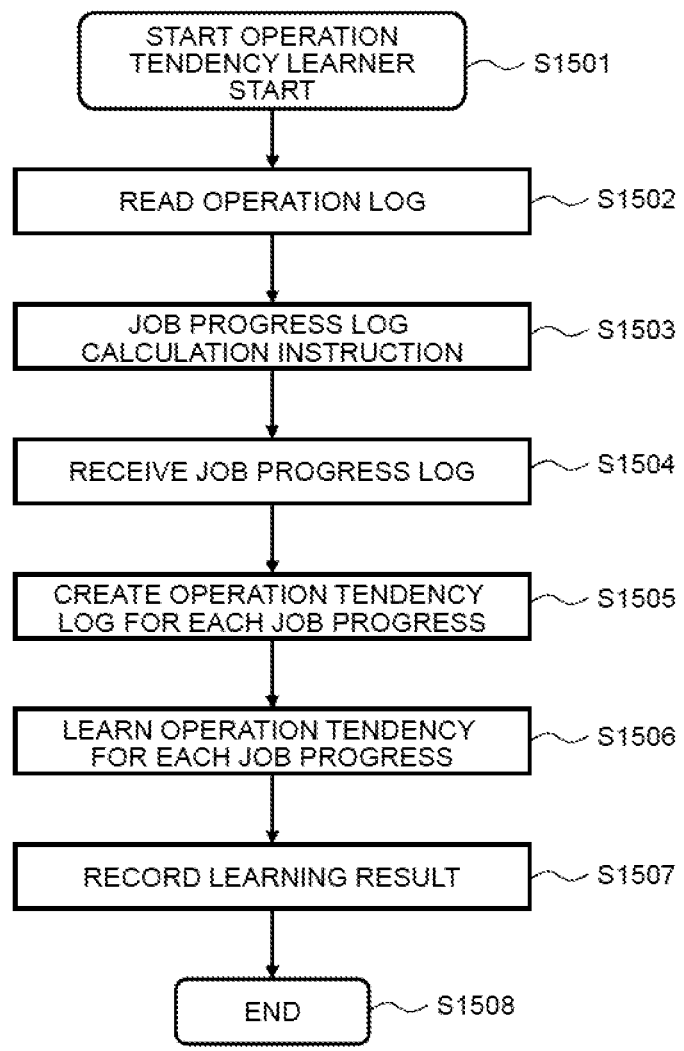
FIG. 15 is a flowchart showing a process executed by an operation tendency learner.

FIG. 15 is a flowchart showing a process executed by the operation tendency learner 1203. The process shown in FIG. 15 is performed for a specific driver. For example, to learn the operation tendencies of ten drivers, the process shown in FIG. 15 is performed ten times, with the driver to be processed being changed. When the processing is started in step S1501, first, in step S1502, the operation tendency learner 1203 reads the operation log 1250 from the operation log storage 1202, and obtains specific information on the driver to be processed. The specific information is, for example, the acceleration and the speed.

Next, in step S1503, the operation tendency learner 1203 issues a calculation instruction for the job progress log 400, to the job progress calculator 106. Upon receipt of this calculation instruction from the operation tendency learner 1203, the job progress calculator 106 reads the operation log of the driver to be processed, from the operation log storage 1202, and calculates the job progress, based on the job ID 1303 and the position 1305 of the vehicle in the operation log 1250. The calculation of the job progress requires information on the route to the arrival place and the arrival time point, in addition to the position of the vehicle. Accordingly, the job progress calculator 106 transmits, to the simulation computer 104, the job ID 1303 received from the operation log 1250, and waits for transmission of the information described above from the simulation computer 104.

Upon receipt of the job ID 1303 from the job progress calculator 106, the simulation computer 104 reads the transportation plan associated with the job ID 1303 from the transportation plan storage 114, calculates the route, and transmits the information on the route to the arrival place and the arrival time point on the job to the job progress calculator 106. Upon receipt of the information from the simulation computer 104, the job progress calculator 106 calculates the job progress through procedures similar to those in the first embodiment, and transmits the aforementioned job progress, as the job progress log 400, to the operation tendency learner 1203.

In step S1504 the operation tendency learner 1203 receives the job progress log 400 from the job progress calculator 106, and in subsequent step S1505 the operation tendency learner 1203 records the operation tendency log 1202A associated with the job progress log 400, based on the time and date 1304. In subsequent step S1506, the operation tendency learner 1203 learns the operation tendency with respect to each job progress, from the vehicle operation tendency log (FIG. 14) with respect to each job progress. An example of a method of learning the operation tendency with respect to each job progress may be a method of aggregating the frequencies of the rapid acceleration and deceleration with respect to each job progress using a threshold, as follows.

$$Iac(Dt)=n(A(Dt,a))/n(A(Dt,0)) \quad \text{(Expression 7)}$$

$$Mac(Dt)=\max(A(Dt,0)) \quad \text{(Expression 8)}$$

$$Ide(Dt)=n(B(Dt,b))/n(B(Dt,0)) \quad \text{(Expression 9)}$$

$$Mde(Dt)=\min(B(Dt,0)) \quad \text{(Expression 10)}$$

Note that in Expressions 7 to 10, it is assumed that the threshold for rapid acceleration is a, the threshold for rapid deceleration is b, the job progress is Dt, a function of obtaining all the sets of accelerations of the target drivers having a job progress of dt and an acceleration value larger than a is A(Dt, a), and a function of obtaining all the accelerations of the target drivers having a job progress of Dt and an acceleration value less than b is B(Dt, b). It is also assumed that a function of obtaining the maximum value of inputs is max, a function of obtaining the minimum value of inputs is min, a function of outputting the rapid acceleration frequency associated with the job progress Dt is Iac, and a function of outputting the rapid deceleration frequency associated with the job progress Dt is Ide. It is further assumed that the maximum acceleration of the target driver associated with the job progress Dt is Mac(Dt), the maximum deceleration of the target driver associated with the job progress is Mde(Dt), and a function of obtaining the number of input elements is n. Lastly, in step S1507, the operation tendency learner 1203 records a learning result, and finishes the processing.

Thus, the table (FIG. 7) that associates the difference from the scheduled time point and the rapid acceleration and deceleration frequencies, and is assumed in the first embodiment can be created. In addition to the rapid acceleration and deceleration frequencies, the maximum acceleration and the maximum deceleration are aggregated with respect to each difference from the scheduled time point of the target driver, thereby contributing to the reproducibility of the number of stops and the energy consumption. As example of the process of operation tendency learning 1206, an example of associating the vehicle operation tendency with respect to each job progress by the association table has been described. Alternatively, through machine learning method, such as a random forest or a neural network, the vehicle operation tendency may be learned with respect to each travel condition in addition to each job progress.

According to the third embodiment described above, the following working effects are achieved.

(5) The computational system S3 includes: the vehicle information obtainer 1201 that collects the operation log 1250 of the vehicle with respect to each driver; the transportation plan storage 114 that stores job information with respect to each driver; and an operation tendency learner 1203 that creates tendency information by calculating the operation tendency, based on the operation log 1250 and the job information. Accordingly, from the vehicle operation log data during the driver's execution of the transportation plan, the job progress and the vehicle operation tendency can be associated with each other with respect to each driver.

Fourth Embodiment

Hereinafter, referring to FIGS. 16 to 20, a fourth embodiment of a computational system is described. In the following description, configuration elements identical to those in the first embodiment are assigned the same symbols, and differences are mainly described. What is not specifically described is the same as in the first embodiment. This embodiment is different from the first embodiment mainly in that effects of the driver's physiological characteristics on the vehicle operation tendency are considered.

The reasons of focusing the attention on the fact that the physiological characteristics affect the operation tendency in this embodiment are, for example, the following three points. The first reason is that when the continuous driving time is long, the personalities of the continuous concentration time and fatigue have an effect and increase the rapid acceleration and deceleration frequencies. The second reason is that when an instruction for a rest is issued to prevent the continuous driving time from increasing, the instruction affects the transportation time and the job progress. The third reason is that the personalities of the frequencies of meals and excretion have an effect, and vary the frequency of the rest, thereby causing the difference in job progress.

This embodiment considers two states of rest and drive for the driver. Similar to the first embodiment, in the "drive" state of the driver, the driver drives the vehicle and goes toward the arrival place. In the "rest" state of the driver, the driver is taking a rest with the vehicle being stopped. Accordingly, the vehicle speed is zero for a time specific to each driver.

Figure 16:
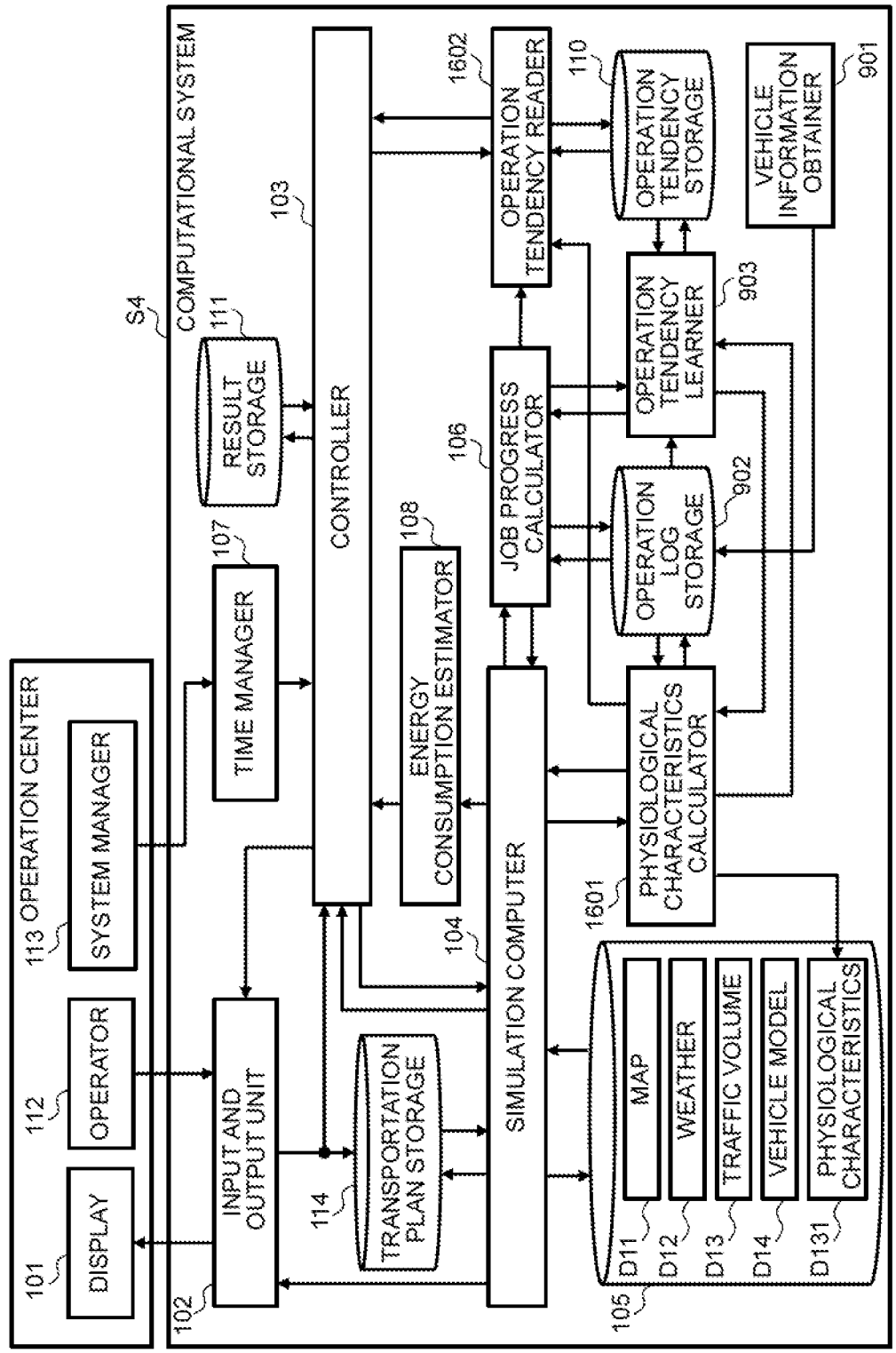
FIG. 16 is a configuration diagram showing a computational system according to a fourth embodiment.

FIG. 16 is the configuration diagram showing the computational system S4 according to the fourth embodiment. The computational system S4 further includes a physiological characteristics calculator 1601, in addition to the configuration of the computational system S1 according to the first embodiment. The physiological characteristics calculator 1601 calculates physiological characteristics D131 that are physiological characteristics of the driver, and stores them as physiological characteristics D131 in the storage 105.

FIG. 17 shows an example of the physiological characteristics D131. The physiological characteristics D131 includes a driver ID 1701 that is an identifier of the driver, a rest frequency 1702, and a rest length 1703.

The physiological characteristics calculator 1601 has: a function of calculating the physiological characteristics D131 from the operation log storage 1202 during learning, recording them in the storage 105, and transmitting the calculation result to the operation tendency learner 1203; and a function of receiving the position and the speed in the time series on the simulation from the simulation computer 104 during estimation, calculating the physiological characteristics D131, and transmitting the calculation result to an operation tendency reader 1602. First, the process during learning is described, and the function during estimation is described later.

Figure 18:
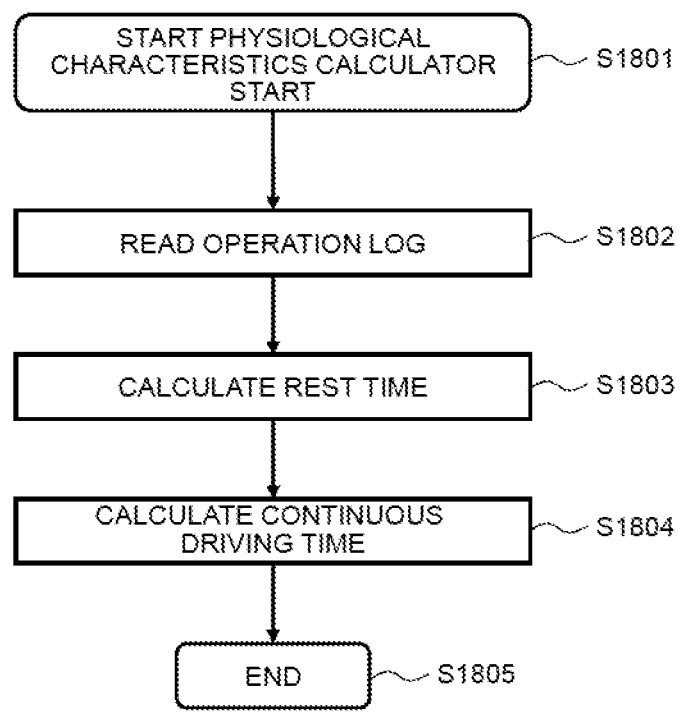
FIG. 18 is a flowchart showing a process of a physiological characteristics calculator.

FIG. 18 is a flowchart showing a process of the physiological characteristics calculator 1601. When the physiological characteristics calculator 1601 starts the processing in step S1801, first, in step S1802, this calculator reads the operation log from the operation log storage 1202. In subsequent step S1803, the physiological characteristics calculator 1601 calculates the physiological characteristics D131 as follows. An example of the physiological characteristics D131 may be the rest time, and the continuous driving time. When the vehicle continues stopping for a threshold time or longer based on time-series position data, the physiological characteristics calculator 1601 determines the state as a rest.

The physiological characteristics calculator 1601 calculates the rest frequency, based on the rest length from the rest start to the rest end, and on the time from the rest end to the next rest start, and records the rest length and the rest frequency as the physiological characteristics D131. In subsequent step S1804, the physiological characteristics calculator 1601 calculates the continuous driving time as the lapsed time from the rest end, and transmits the calculation result to the operation tendency learner 1203. Upon receipt of the continuous driving time, the operation tendency learner 1203 associates the job progress and the continuous driving time with the operation tendency with respect to each driver. The process shown in FIG. 18 has thus been described.

FIG. 19 shows an example of an operation tendency 110A2 stored in the operation tendency storage 110 according to this embodiment. In the operation tendency 110A2, a driver ID 1901, a continuous driving time 1903, a job progress 1902, and an operation tendency 1904 are associated with each other. This association may be made by, for example, a method of aggregating the rapid acceleration and deceleration frequencies with respect to each job progress and each continuous driving time, using a threshold as follows.

$$Iac(Dt, Wt) = n(A(Dt, Wt, a))/n(A(Dt, Wt, 0)) \quad \text{(Expression 11)}$$

$$Ide(Dt, Wt) = n(B(Dt, Wt, b))/n(B(Dt, Wt, 0)) \quad \text{(Expression 12)}$$

Note that Expressions 11 and 12 assume that the rapid acceleration threshold is a, the rapid deceleration threshold is b, the job progress is Dt, the continuous driving time is Wt, and a function of obtaining all the sets of accelerations of the target driver having a job progress of Dt, a continuous driving time of Wt, and an acceleration value larger than a is A(Dt, Wt, a). It is also assumed that a function of obtaining all the accelerations of the target driver having a job progress of Dt, a continuous driving time of Wt, and an acceleration value less than b is B(Dt, Wt, b), and a function of outputting the rapid acceleration frequency associated with the job progress Dt and the continuous driving time Wt is Iac(Dt, Wt). It is further assumed that a function of outputting the rapid deceleration frequency associated with the job progress Dt and the continuous driving time Wt is Ide(Dt, Wt), and a function of obtaining the number of input elements is n.

As described above, after the job progress and the continuous driving time are associated with the operation tendency with respect to each driver, the association is recorded in the operation tendency storage 110. Next, a process of estimating the energy consumption in the simulation is described.

Figure 20:
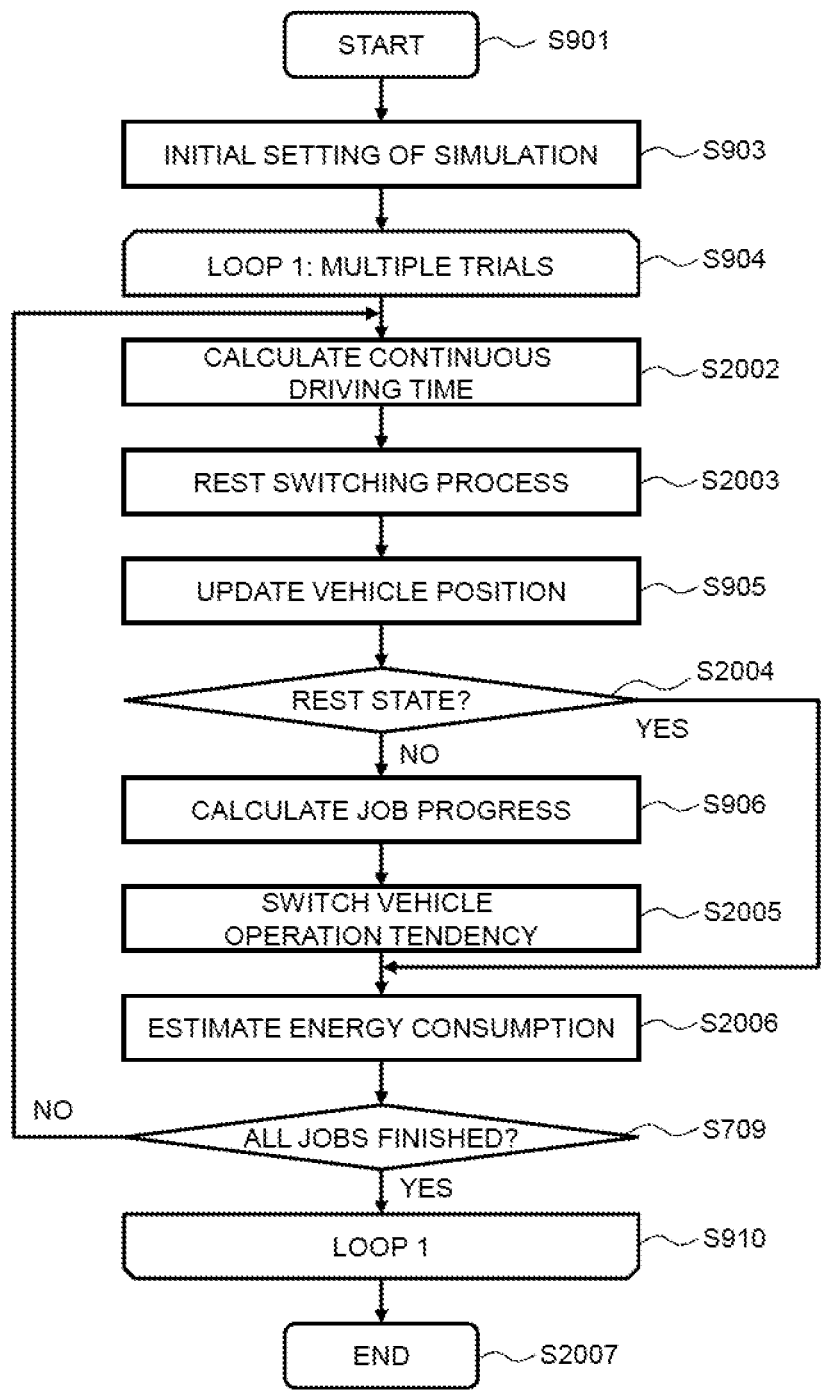
FIG. 20 is a flowchart of a process of energy consumption prediction according to the fourth embodiment.

FIG. 20 is a flowchart of a process of energy consumption prediction according to this embodiment. In FIG. 20, processes similar to those in the first embodiment are assigned the same step numbers, and the description thereof is omitted. Note that in FIG. 20, for the sake of convenience of drawing, description of steps S902 and S911 is omitted. The process of estimating the energy consumption has been as described in steps S903 to S910 in FIG. 9 in the first embodiment. The fourth embodiment includes steps S2004 to S2006, which are different from those in the first embodiment. Furthermore, the processes of steps S2002 to S2003 required to estimate the energy consumption are added. Hereinafter, description is specifically made.

In step S2002 executed first in the loop, the continuous driving time of the driver to be processed is calculated. Specifically, the physiological characteristics calculator 1601 calculates the lapsed time from the time point of the last rest of the driver in the transport job, and transmits the continuous driving time to the operation tendency reader 1602. In subsequent step S2003, the rest frequency 1702 and the rest length 1703 associated with the driver ID 1701 of the driver in the transport job are read from the physiological characteristics D131. If the continuous driving time calculated in the continuous driving time calculation process S2002 exceeds the rest frequency 1702, the driver is made to be in the rest state. If the driver has already been in the rest state, the rest length 1703 is compared with the lapsed time from the start of the rest. If the driver's rest length 1703 is exceeded, the driver is made to be in the drive state.

In subsequent step S905, the position of the vehicle is updated, the processing proceeds to step S2004, in which it is determined whether the state is the rest state or not. If the driver is in the rest state, it is conceivable that there is no job progress but the energy consumption due to an air conditioner is present, and the processing proceeds to step S1708 accordingly. If the driver is not in the rest state, the processing proceeds to step S906, similar process as in the first embodiment is applied, and the processing proceeds to step S2005.

Unlike the first embodiment, in step S2005 the vehicle operation tendency is switched based on the continuous driving time in addition to the job progress. Specifically, as described below. The operation tendency reader 1602 reads the operation tendency of the driver associated with the driver ID 1901, based on the association table shown in FIG. 19 from the operation tendency storage 110, based on the job progress received from the job progress calculator 106, the continuous driving time received from the physiological characteristics calculator 1601, and the driver ID 1901 received from the controller 103, and transmits the tendency to the controller 103. Accordingly, the operation tendency reader 1602 transmits the change in rapid acceleration or deceleration frequencies due to the driver's continuous driving time, to the simulation computer 104 via the controller 103. The processing content step S2005 has thus been described. In step S2006, the energy consumption is estimated using the operation tendency switched by the process in step S2005.

According to the fourth embodiment described above, the following working effects are achieved.

(6) The tendency information is combined with the continuous driving time that is a time of continuous driving of the vehicle. The operation tendency reader 1602 reads the operation tendency of the driver from the tendency information, using the job progress, the driver ID, and the continuous driving time. Accordingly, the accuracy of estimating the vehicle energy consumption can be improved by considering the physiological condition as the characteristics specific to the driver, and considering the effects of the physiological condition on the vehicle operation tendency.

Fifth Embodiment

Hereinafter, referring to FIGS. 21 to 25, a fourth embodiment of a computational system is described. In the following description, configuration elements identical to those in the first embodiment are assigned the same symbols, and differences are mainly described. What is not specifically described is the same as in the first embodiment. This embodiment is different mainly in that the operation tendency is switched further in consideration of a transport object mounted on the vehicle.

The reasons that the loading state of the vehicle affects the operation tendency are, for example, the following two reasons. The first reason is that a certain type of transport objects is a factor of making the driver to drive with attention being paid. The second reason is that the difference in vehicle total weight due to the transport object varies the application of acceleration or deceleration to the vehicle when the driver applies acceleration or braking in the same manner. In this embodiment, the vehicle total weight and the type of the transport object are used the loading state.

Figure 21:
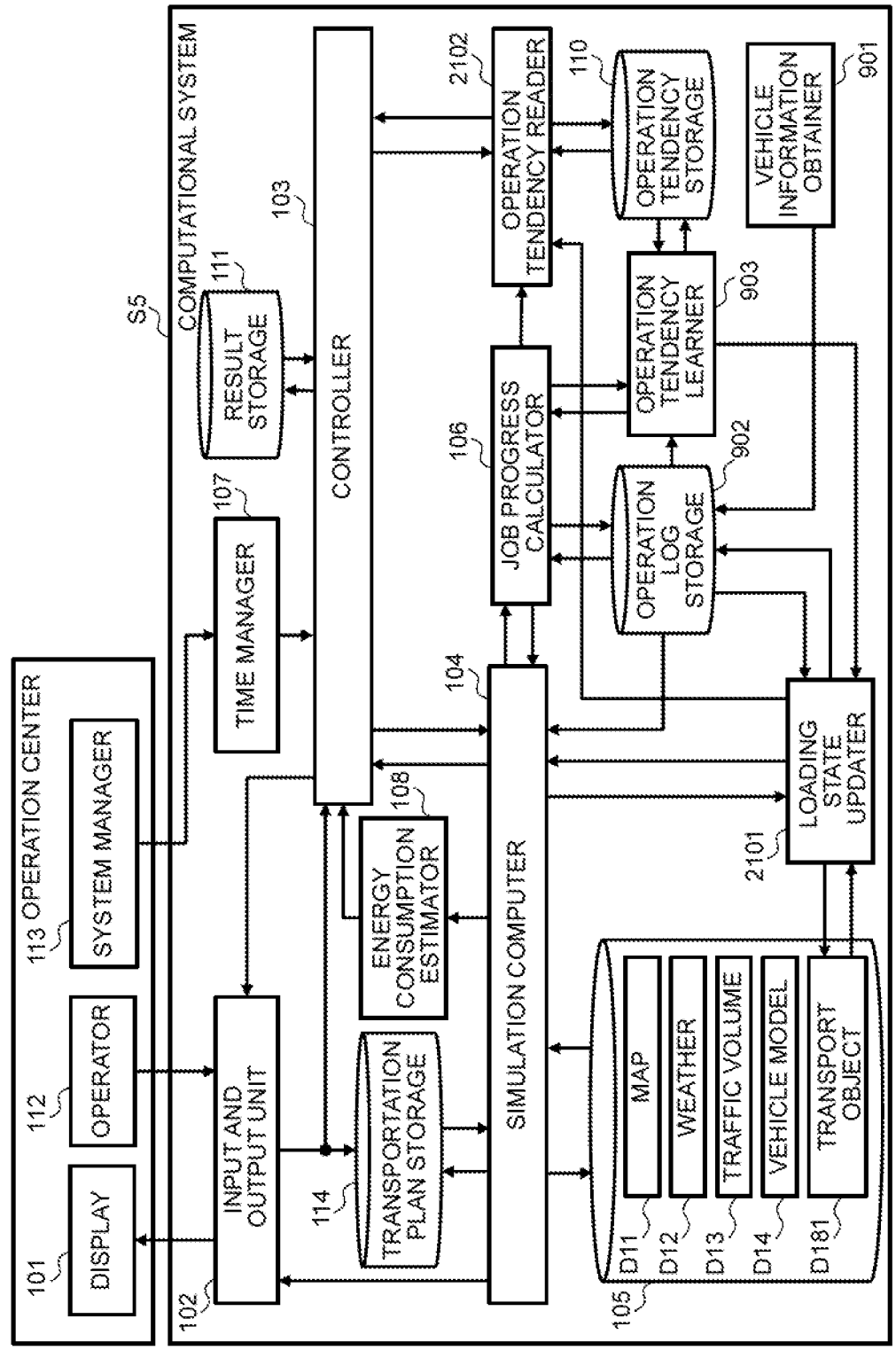
FIG. 21 is a configuration diagram showing a computational system according to a fifth embodiment.

FIG. 21 is the configuration diagram showing the computational system S5 according to the fifth embodiment. In the computational system S5, information on the transport object to be transported on the vehicle is stored as a transport object D181 in the storage 105. Note that the transport object D181 is information about the transport object, and can be also called "transport information" accordingly. The computational system S5 further includes a loading state updater 2101 that updates the transport object D181. The operation of the operation tendency reader 2102 is different from that in the first embodiment.

FIG. 22 shows an example of the transport object D181. The transport object D181 includes: a transport object ID 2201 that is an identifier of the transport object; a job ID 2202 that is an identifier of a job of transporting the transport object; a loading place 2203 that represents a place for loading the transport object; an unloading place 2204 that represents a place for unloading the transport object; a weight 2205 that represents the weight of the transport object; and a type 2206 that represents the type of the transport object.

First, the loading state updater 2101 reads, from the transport object D181, information on the transport object associated with the job ID 2202 performed by the driver. When the driver reaches the loading place 2203 or the unloading place 2204, the loading state updater 2101 updates the loading state, i.e., the total load weight of the vehicle and the type of the transport object mounted on the vehicle.

Execution of the update process by the loading state updater 2101 is both at the time of learning the association of the job progress and the loading state with the operation tendency with respect to each driver, and at the time of estimating the vehicle energy consumption through the simulation. Note that when the driver is assigned multiple jobs, the job progress is calculated with reference to the transportation plan, and the loading state is updated with reference to the transport object D181. This is because the departure place 302a of the job performed by the driver is the unloading place 2204 of the transport object of a job executed before the job but is not the loading place 2203 of the transport object of the job in some cases.

FIG. 23 shows an example of an operation tendency 110A3 stored in the operation tendency storage 110 according to this embodiment. In the operation tendency 110A3, a driver ID 2301, a job progress 2302, a loading state 2303, and an operation tendency 2306 are associated with each other.

Figure 24:
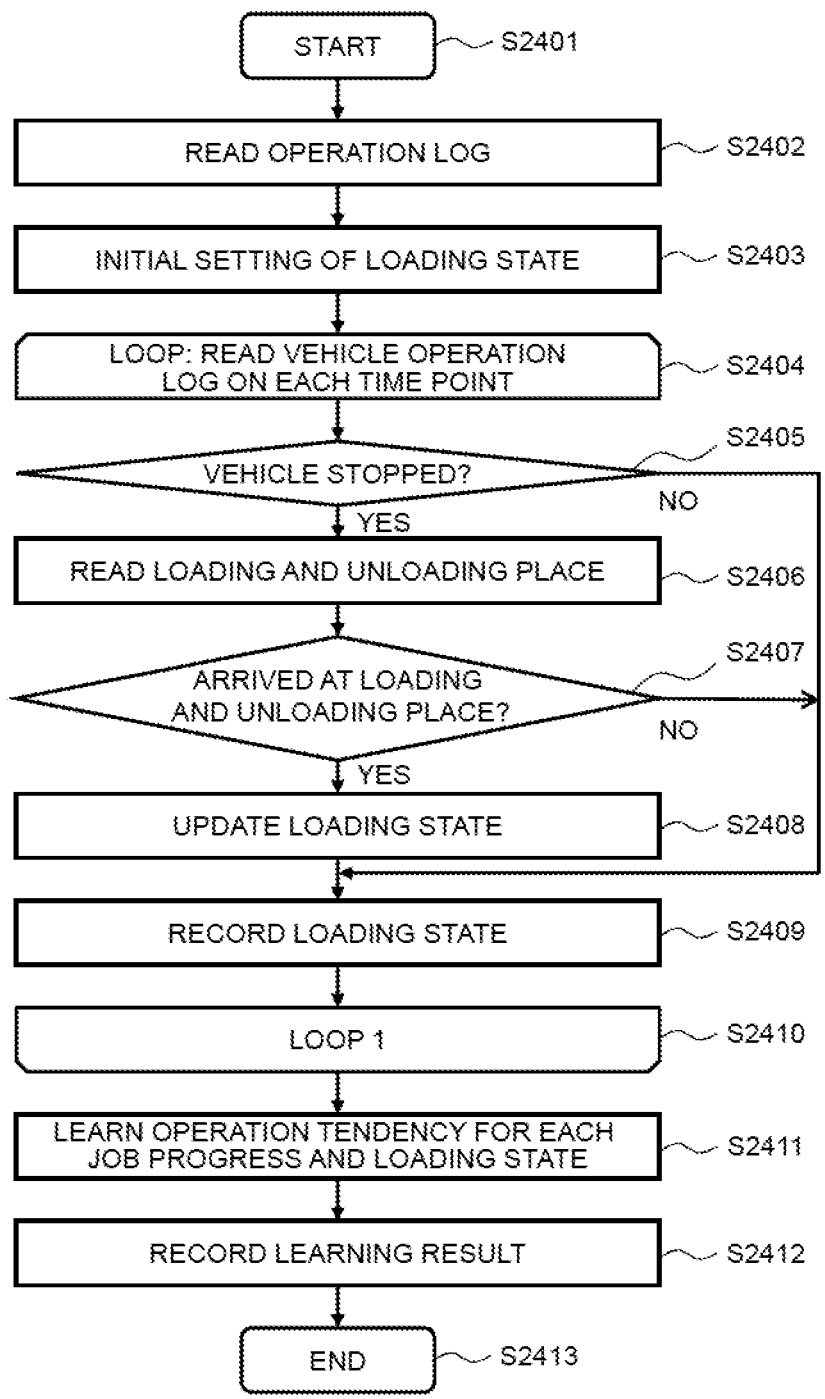
FIG. 24 is a flowchart of learning association.

FIG. 24 is a flowchart showing processes of learning the association of the job progress and the loading state with the operation tendency according to this embodiment. The processes are classified into processes of steps S2401 to S2409 of assigning the loading state to the operation log performed by the loading state updater 2101, and processes of steps S2411 to S2413 of associating the job progress and the loading state with the operation tendency by the operation tendency learner 1203, and recording the result.

First, the processes of steps S2401 to S2409 of assigning the loading state to the operation log are sequentially described. The main processes started from step S2401 is initiated by the operation tendency learner 1203 issuing an instruction of calculating the loading state to the loading state updater 2101. First, in step S2402, the loading state updater 2101 reads the operation log from the operation log storage 1202. In subsequent step S2403, initial setting of the vehicle total weight is configured. In the initial setting, the vehicle weight 1107d associated with the vehicle ID 1302 in the operation log is read from the vehicle model D14, and the vehicle weight 1107d is set as the vehicle total weight.

In subsequent steps S2404 to S2410, the operation log is read at each time point, and updating and recording of the vehicle total weight and the transport type are repeated. Specifically, in step S2405, it is determined whether the vehicle is stopped or not based on the position 1305 and the speed 1306 in the operation log. If it is determined not to be stopped, the processing proceeds to step S2409, in which the vehicle total weight and the type of the transport object are recorded. If it is determined that the vehicle is stopped in step S2405, the processing proceeds to step S2406. In step S2406, the loading place 2203 and the unloading place 2204 of the transport object associated with the job ID 1303 are read from the transport object D181, and the processing proceeds to step S2407.

In step S2407, it is determined whether the loading place 2203 or the unloading place 2204 is reached or not. If it is determined that the loading place 2203 or the unloading place 2204 is not reached, the processing proceeds to step S2409, in which the vehicle total weight and the type of the transport object are stored. If it is determined that the loading place 2203 or the unloading place 2204 is reached, the processing proceeds to step S2408, in which the weight 2205 and the type 2206 of the transport object are read from the transport object D181, and the loading state of the vehicle is updated.

Specifically, when the loading place 2203 is reached, the update process adds the numerical value of the weight 2205 to the numerical value of the vehicle total weight, and the type 2206 is added to the set of the load type. When the unloading place 2204 is reached, the numerical value of the weight 2205 is subtracted from the numerical value of the vehicle total weight, and the set of the load type is updated in conformity with the remaining transport objects. In step S2409, the vehicle total weight and the load type are recorded in the operation log as the loading state of the vehicle, together with the driver ID 1301 and the time and date 1304. The processes of steps S2402 to S2409 are repeated until the end of the operation log, thereby adding the loading state to the operation log.

After the loading state updater 2101 records the loading state of the vehicle in the operation log, the processing proceeds to step S2411, the operation tendency learner 1203 learns the association of the job progress and the loading state with the operation tendency. An example of this association may be a method of aggregating the rapid acceleration and deceleration frequencies with respect to each loading state of the vehicle and each job progress, using a threshold as described below.

$$Iac(Dt,S) = n(A(Dt,S,a))/n(A(Dt,S,0))$$ (Expression 13)

$$Ide(Dt,S) = n(B(Dt,S,b))/n(B(Dt,S,0))$$ (Expression 14)

Note that Expressions 13 and 14 assume that the rapid acceleration threshold is a, the rapid deceleration threshold is b, the job progress is Dt, the loading state of the vehicle is S, and a function of obtaining all the accelerations of the target driver having a job progress of Dt, a vehicle loading state of S, and an acceleration larger than a is A(Dt, S, a). It is also assumed that a function of obtaining all the accelerations of the target driver having a job progress of Dt, a vehicle loading state is S, and an acceleration value less than b is B(Dt, S, b), and a function of outputting the rapid acceleration frequency associated with the job progress Dt and the vehicle loading state S is Iac(Dt, S). It is further assumed that a function of outputting the rapid deceleration frequency associated with the job progress Dt and the vehicle loading state S is Ide(Dt, S), and a function of obtaining the number of input elements is n.

Lastly, in step S2412, the association described above is recorded in the operation tendency storage 110. The result of the recording is the operation tendency 110A3 shown in FIG. 23. The procedures of creating the association table between the vehicle job progress and the loading state, and the operation tendency shown in FIG. 23 have been described so far using the flowchart of FIG. 24.

FIG. 25 is a flowchart of a process of energy consumption prediction according to the fifth embodiment. Unlike the first embodiment, in this embodiment, the operation tendency of the driver is switched based on the vehicle loading state in addition to the job progress. In FIG. 25, processes similar to those in the first embodiment are assigned the same step numbers, and the description thereof is omitted. Note that in FIG. 25, for the sake of convenience of drawing, description of steps S902 and S911 is omitted.

Unlike the first embodiment, after step S906 of calculating the job progress, the loading state updater 2101 performs the processes of steps S2405 to S2408 shown in FIG. 24. That is, the loading state updater 2101 reads the transport object D181, updates the vehicle loading state, and the loading state updater 2101 transmits the loading state to the operation tendency reader 2102. Subsequent to step S2408, or in the case of negative determination in step S2405, step S2503 is executed. In step S2503, the operation tendency reader 2102 reads the operation tendency associated with the loading state and the job progress from the operation tendency storage 110, and transmits the operation tendency to the simulation computer 104 via the controller 103. In subsequent step S2504, the change in rapid acceleration or deceleration due to the vehicle loading state is used, thereby improving the accuracy of estimating the energy consumption.

According to the fifth embodiment described above, the following working effects are achieved.

(7) The tendency information is combined with transport information that is information on a transport object transported by the vehicle. The operation tendency reader 2102 reads the operation tendency of the driver from the tendency information, using the job progress, the driver ID, and the transport information. Accordingly, the accuracy of estimating the vehicle energy consumption can be improved by considering the vehicle loading state as the characteristics specific to the driver, and considering the effects of the loading state on the vehicle operation tendency.

(8) The transport information is at least one of the total weights of the vehicle including the transport object, and the type of the transport object.

Modified Example of Fifth Embodiment

The configuration in the fifth embodiment may be combined with the configuration in the fourth embodiment. That is, the physiological characteristics D131 may be further stored in the storage 105 in the fifth embodiment, and the computational system may further include the physiological characteristics calculator 1601.

Each of the configuration of the functional blocks in the embodiments and the modified examples described above is only an example. Some functional configuration elements described as separate functional blocks may be integrally configured. A configuration represented by one functional block diagram may be divided into two or more functions. A configuration may be adopted so that a part of the function that each functional block has may be included in another functional block.

In the embodiments and the modified examples described above, it is assumed that the program is stored in the ROM 22 of the computational apparatus 20. Alternatively, the program may be stored in the flash memory 26. The computational apparatus 20 may include an input and output interface, not shown. The program may be read from another device via a medium capable of using the input and output interface as required. Here, the medium may be, for example, a storage medium attached to the input and output interface in a detachable manner, or a communication medium, i.e., a wired, wireless, or optical network, or carrier waves where allowing propagation on the network, or digital signals. Some or all the functions achieved by the program may be achieved by a hardware circuit or an FPGA.

The embodiments and the modified examples described above may be combined with each other. The various embodiments and modified examples are described above. However, the present invention is not limited to these details. The other modes conceivable within the technical spirit of the present invention are encompassed by the present invention.

REFERENCE SIGNS LIST

S1 to S4 . . . Computational system
104 . . . Simulation computer
105 . . . Storage
106 . . . Job progress calculator
107 . . . Time manager
108 . . . Energy consumption estimator
106 . . . Job progress calculator
107 . . . Time manager
108 . . . Energy consumption estimator
109, 1602, 2102 . . . Operation tendency reader
110 . . . Operation tendency storage
114 . . . Transportation plan storage
1201 . . . Vehicle information obtainer
1202 . . . Operation log storage

What is claimed is:
1. A computational system estimating an energy consumption of a vehicle operated by a driver, the computational system comprising:

a job progress calculator configured to calculate a job progress that is a delay time from a scheduled time on a simulation;

an operation tendency storage configured to store tendency information that is a combination of a driver ID that is an identifier of the driver, the job progress, and an operation tendency of the driver, the operation tendency including at least one of a frequency of a sudden start, in which an acceleration of the vehicle exceeds a first threshold, and a frequency of a sudden stop, in which a deceleration of the vehicle exceeds a second threshold;

an operation tendency reader configured to read the operation tendency of the driver from the tendency information, using the job progress calculated by the job progress calculator, and the driver ID of the driver who is a computation target; and a simulation computer configured to calculate the energy consumption of the vehicle, based on the operation tendency read by the operation tendency reader, with respect to each driver who is the computation target.

2. The computational system according to claim 1, further comprising:

a collector configured to collect an operation log of the vehicle with respect to each driver;

a transportation plan storage configured to store job information with respect to each driver; and a tendency information creator configured to create the tendency information, by calculating the job progress, based on the operation log and the job information, wherein the operation log includes a position, a speed, and an acceleration of the vehicle at each time point, and the job information includes a departure place, an arrival place, and an arrival deadline.

3. The computational system according to claim 1, further comprising a transportation plan storage configured to store job information that indicates a departure place, a destination place, and a scheduled arrival time point at the destination place, with respect to each driver, wherein the job progress calculator calculates the job progress, based on a position of the driver at a certain time point on the simulation, and the job information.

4. The computational system according to claim 1, wherein the tendency information is also combined with a continuous driving time that is a time of continuous driving of the vehicle, and the operation tendency reader reads the operation tendency of the driver from the tendency information, using the job progress, the driver ID, and the continuous driving time.

5. The computational system according to claim 1, wherein the tendency information is also combined with transport information that is information on a transport object transported by the vehicle, and the operation tendency reader reads the operation tendency of the driver from the tendency information, using the job progress, the driver ID, and the transport information.

6. The computational system according to claim 5, wherein the transport information is at least one of a total weight of the vehicle including the transport object, and a type of the transport object.

7. The computational system according to claim 1, wherein the simulation computer calculates the energy consumption of the vehicle, further using at least one of an inclination angle of a road surface, weather, a traffic volume, and a vehicle model.

8. A computational method of causing a computer to estimate an energy consumption of a vehicle operated by a driver, the computational method comprising:

a job progress calculation step of calculating a job progress that is a delay time from a scheduled time on a simulation;

a tendency information reading step of reading tendency information that is a combination of a driver ID that is an identifier of the driver, the job progress, and an operation tendency of the driver, the operation tendency including at least one of a frequency of a sudden start, in which an acceleration of the vehicle exceeds a first threshold, and a frequency of a sudden stop, in which a deceleration of the vehicle exceeds a second threshold;

an operation tendency reading step of reading the operation tendency of the driver from the tendency information, using the job progress calculated in the job progress calculation step, and the driver ID of the driver who is an computation target; and a simulation computing step of calculating the energy consumption of the vehicle, based on the operation tendency read in the operation tendency reading step, with respect to each driver who is the computation target.

* * * * *